United States Patent [19]

Tzikas et al.

[11] Patent Number: 4,876,334

[45] Date of Patent: Oct. 24, 1989

[54] TRIAZINYL REACTIVE DYES IN WHICH THE TRIAZINYL IS FURTER SUBSTITUTED WITH A REACTIVE RADICAL

[75] Inventors: Athanassios Tzikas, Pratteln; Paul Herzig, Basel, both of Switzerland

[73] Assignee: Ciba-Geigy Corporation, Ardsley, N.Y.

[21] Appl. No.: 150,695

[22] Filed: Feb. 1, 1988

[30] Foreign Application Priority Data

Feb. 6, 1987 [CH] Switzerland ............ 445/87

[51] Int. Cl.$^4$ .......... C09B 62/02; C09B 62/04; C09B 62/443; C09B 62/503

[52] U.S. Cl. ............ 534/632; 534/617; 534/618; 534/619; 534/620; 534/621; 534/622; 534/623; 534/624; 534/625; 534/626; 534/627; 534/628; 534/629; 534/630; 534/631; 534/633; 534/634; 534/635; 534/636; 534/637; 534/638; 534/639; 534/640; 534/641; 534/642; 534/643; 534/644

[58] Field of Search .................. 534/622–643, 534/617, 618–620; 544/99, 113, 181, 187, 204

[56] References Cited

U.S. PATENT DOCUMENTS

| 3,223,470 | 12/1965 | Boedeker et al. | 8/39 |
| 4,754,023 | 6/1988 | Tzikas et al. | 534/618 |

FOREIGN PATENT DOCUMENTS

| 0074928 | 3/1983 | European Pat. Off. | |
| 0144766 | 6/1985 | European Pat. Off. | |
| 0179019 | 4/1986 | European Pat. Off. | 534/637 |
| 0208655 | 1/1987 | European Pat. Off. | |
| 0210951 | 2/1987 | European Pat. Off. | |
| 2026527 | 2/1980 | United Kingdom | 534/638 |

*Primary Examiner*—Floyd D. Higel
*Attorney, Agent, or Firm*—Wenderoth, Lind & Ponack

[57] ABSTRACT

Reactive dyes of the formula

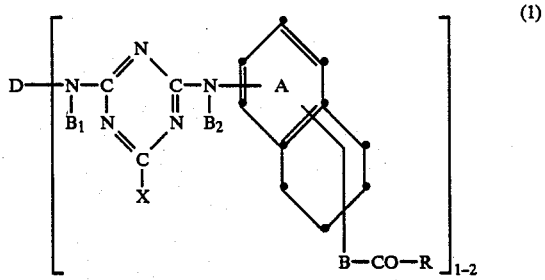

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $B_1$ and $B_2$ are independently of each other hydrogen or alkyl which has 1 to 4 carbon atoms and which can be substituted by halogen, hydroxyl, cyano, $C_{1-4}$alkoxy, $C_{1-4}$alkoxycarbonyl, carboxyl, sulfamoyl, sulfo or sulfato, X is fluorine, chlorine, bromine, sulfo, alkylsulfonyl having 1 to 4 C atoms or phenylsulfonyl, B is a —$CH_2$—$_n$ or —O—$CH_2$—$_n$ radical, n is 1 to 6, R is a radical of the formula

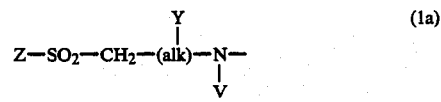

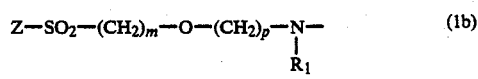

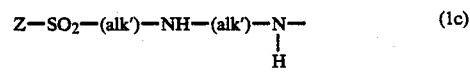

or

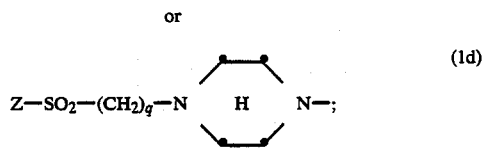

Z is β-sulfatoethyl, β-thiosulfatoethyl, β-phosphatoethyl, β-acyloxyethyl, β-haloethyl or vinyl, alk is an alkylene radical having 1 to 6 C atoms or a branched isomer thereof, Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a —$SO_2$—Z radical, in which Z is as defined above, V is hydrogen or an alkyl radical having 1 to 4 C atoms and which can be substituted by carboxyl or sulfo groups or by derivatives thereof, or by alkoxy groups having 1 to 2 C atoms, halogen or hydroxyl, or a

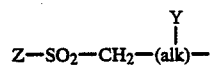

radical in which Z, alk and Y are as defined above, $R_1$ is hydrogen or $C_{1-6}$alkyl, the alk's are independently of each other polymethylene radicals having 2 to 6 C atoms or branched isomers thereof, m is 1 to 6, p is 1 to 6 and q is 1 to 6, and the benzene or naphthalene radical A can contain further substituents are suitable in particular for dyeing or printing cellulose-containing fibre materials by the cold pad-batch method and, while giving a high dyeing yield, produce dyeings and prints having good fastness properties.

29 Claims, No Drawings

TRIAZINYL REACTIVE DYES IN WHICH THE TRIAZINYL IS FURTER SUBSTITUTED WITH A REACTIVE RADICAL

The present application relates to novel improved reaction dyes which are suitable in particular for dyeing cellulose-containing fibre materials by the exhaust method or by the cold pad-batch method and which produce wet- and light-fast dyeing, to processes for preparing these dyes, and to the use thereof for dyeing or printing textile materials.

The Invention provides reactive dyes of the formula

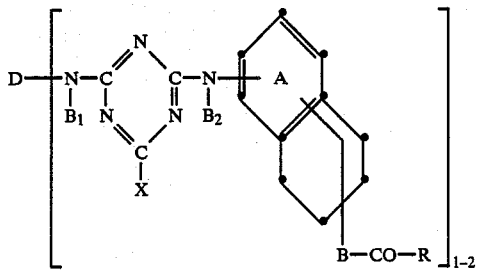

(1)

in which D is the radical of a monoazo, polyazo, metal complex azo, anthraquinone, phthalocyanine, formazan, azomethine, dioxazine, phenazine, stilbene, triphenylmethane, zanthene, thioxanthone, nitroaryl, naphthoquinone, pyrenequinone or perylenetetracarbimide dye, $B_1$ and $B_2$ are independently of each other hydrogen or alkyl which has 1 or 4 carbon atoms and which can be substituted by halogen, hydroxyl, cyano, $C_{1-4}$alkoxy, $C_{1-4}$alkoxycarbonyl, carboxyl, sulfamoyl, sulfo or sulfato, X is fluorine, chlorine, bromine, sulfo, alkylsulfonyl having 1 to 4 C atoms or phenylsulfonyl, B is a —$CH_{2-n}$ or —O—$CH_{2-n}$ radical, n is 1 to 6, R is a radical of the formula $$Z-SO_2-CH_2-(alk)-\overset{Y}{\underset{V}{N}}-\quad\quad (1a)$$

$$Z-SO_2-(CH_2)_m-O-(CH_2)_p-\overset{}{\underset{R_1}{N}}-\quad\quad (1b)$$

$$Z-SO_2-(alk')-NH-(alk')-\overset{}{\underset{H}{N}}-\quad\quad (1c)$$

or

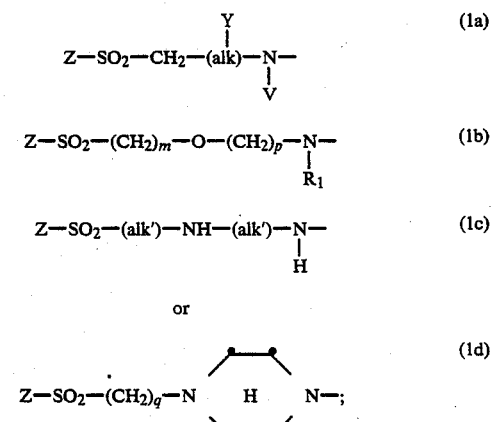

(1d)

Z is β-sulfatoethyl, β-thiosulfatoethyl, β-phosphatoethyl, β-acyloxyethyl, β-haloethyl or vinyl, alk is an alkylene radical having 1 to 6 atoms or a branched isomer thereof, Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a —$SO_2$—Z radical, in which Z is as defined above, V is hydrogen or an alkyl radical having 1 or 4 C atoms and which can be substituted by carboxyl or sulfo groups or by derivatives thereof, or by alkoxy groups having 1 or 2 C atoms, halogen or hydroxyl, or a

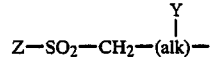

radical in which Z, alk and Y are as defined above, $R_1$ is hydrogen or $C_{1-6}$alkyl, the alk's are independently of each other polymethylene radicals having 2 to 6 C atoms or branched isomers thereof, m is 1 to 6, p is 1 to 6 and q is 1 to 6, and the benzene or naphthalene radical A can contain further substituents.

The radical D in the formula (1) can contain, bonded to its basic structure, the substituents customary with organic dyes.

Examples of further substituents in the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di- β-hydroxyethylamino, N,N-di-β- sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkyl-sulfonyl having 1 to 4 carbon atoms such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-β-hydroxyethyl)-sulfamoyl, N-phenylsulfamoyl, ureido, hydroxyl, carboxyl, sulfomethyl or sulfo. Preferably the radical D contains one or more sulfonic acid groups. Reactive dyes of the formula (1) in which D is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical $B_1$ or $B_2$ is straight-chain or branched; it can be further substituted, for example by halogen, hydroxyl, cyano, $C_{1-4}$-alkoxy, $C_{1-4}$alkoxycarbonyl, carboxyl, sulfamoyl, sulfo or sulfato. Examples of $B_1$ and $B_2$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, βmethoxypropyl, β-chloroethyl, γ-bromopropyl, β-hydroxyethyl, βhydroxybutyl, β-cyanoethyl, sulfomethyl, β-sulfoethyl, aminosulfonylmethyl and βsulfatoethyl. Preferably, $B_1$ and $B_2$ are each hydrogen, methyl or ethyl.

The substituent X which is detachable as an atom, is a halogen atom, such as fluorine, chlorine or bromine, a low molecular weight alkylsulfonyl group, such as methylsulfonyl or ethylsulfonyl, a phenylsulfonyl radical or a sulfo group. Preferably X is fluorine or chlorine.

The radical B contains 1 to 6, preferably 1 to 4, carbon atoms; examples of B are: methylene, ethylene, propylene, butylene, methyleneoxy, ethyleneoxy, propyleneoxy and butyleneoxy. A β-haloethyl Z and a β-acyloxyethyl Z are in particular a β-chloroethyl and a β-acetoxyethyl radical respectively. The alkylene radical alk is preferably methylene, ethylene, methylmethylene, propylene or butylene. An acyloxy radical Y is in particular acetyloxy, propionyloxy or butyryloxy, and an alkoxycarbonyl radical Y is in particular methoxycarbonyl, ethoxycarbonyl or propyloxycarbonyl. An alkyl radical V can be methyl, ethyl, propyl, isopropyl, butyl, isobutyl, sec-butyl or tert-butyl. Derivatives of the carboxyl or sulfo group are for example carbamoyl, N-methyl-, N-ethyl-, N,N-dimethyl and N,N-diethylcarbamoyl, cyano, acetyl, propionyl, butyryl, methoxycarbonyl, ethoxycarbonyl, propyloxycarbonyl, sulfamoyl, N-methyl-, N-ethyl-, N,N-dimethyl- and N,N-diethylsulfamoyl, methylsulfonyl, ethylsulfonyl and propylsulfonyl. The radical $R_1$ is for example methyl, ethyl, propyl, isopropyl, butyl, isobutyl, sec-butyl, tertbutyl, pentyl or hexyl, or preferably hydrogen. The polymethylene radicals alk' are preferably ethylene, propylene or butylene. The indices m, p and q are independent of one another and preferably 2, 3 or 4.

The ring system A within the square brackets of the formula (1) is a benzene or naphthalene nucleus. Possible further substituents on the benzene or naphthalene radical A are the same substituents as mentioned above in the explanation of the radical D. In a radical O—CH$_2$—$_n$B, B is bonded to the ring system A by the oxygen atom.

Also possible are reactive dyes of the formula (1) in which the radical D includes a further reactive radical. The additional reactive radicals enclosed in D can be bonded in D via amino groups or in some other way, for example by direct bond.

The part of the formula (1) which is enclosed in square brackets is a reactive radical which can be present once or twice in the molecule; the two possibilities are equally important. If two reactive radicals are present, they can be identical or different; preferably, the two radicals are identical.

Preferred embodiments of reactive dyes of the formula (1) are:

(a) reactive dyes of the formula

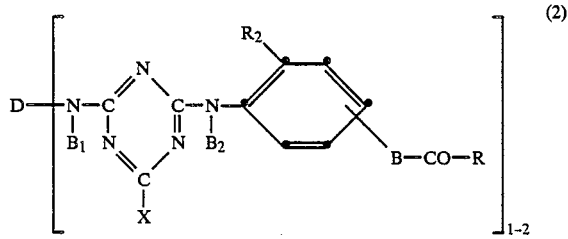

(2)

in which $R_2$ is hydrogen, $C_{1-4}$alkyl, $C_{1-4}$alkoxy, halogen, hydroxyl, carboxyl or sulfo, and D, $B_1$, $B_2$, X, B and R are as defined under the formula (1);

(b) reactive dyes of the formula (1) or (2) in which D is the radical of a monoazo or disazo dye;

(c) reactive dyes of the formula (1) or (2) in which D is the radical of a metal complex azo or formazan dye;

(d) reactive dyes of the formula (1) or (2) in which D is the radical of an anthraquinone dye;

(d) reactive dyes of the formula (1) or (2) in which D is the radical of a phthalocyanine dye;

(f) reactive dyes according to (c), in which D is the radical of a 1:1 copper complex azo dye of the benzene or naphthalene series and the copper atom is bonded on each side to a metallizable group in orthoposition relative to the azo bridge;

(g) reactive dyes according to (b), in which D is a monoazo or disazo dye radical of the formula

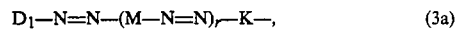

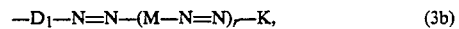

or

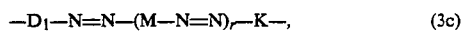

or of a metal complex derived therefrom, $D_1$ is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetonacetarylamide series, where $D_1$, M and K can carry substituents customary with azo dyes, in particular hydroxyl, amino, methyl, ethyl, methoxy or ethoxy groups, substituted of unsubstituted alkanoylamino groups having 2 to 4 C atoms, substituted or unsubstituted benzoylamino groups or halogen atoms, r is 0 or 1, and $D_1$, M and K together contain at least two sulfo groups, preferably 3 or 4 sulfo groups, (h) reactive dyes according to (b), in which D is a disazo dye radical of the formula

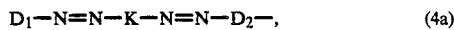

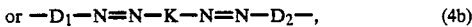

$D_1$ and $D_2$ are independently of each other the radical of a diazo component of the benzene or naphthalene series, and K is the radical of a coupling component of the naphthalene series, where $D_1$, $D_2$ and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms, and $D_1$, $D_2$ and K together contain at least two sulfo groups, preferably three or four sulfo groups;

(i) reactive dyes according to (d), in which D is the radical of an anthraquinone dye of the formula

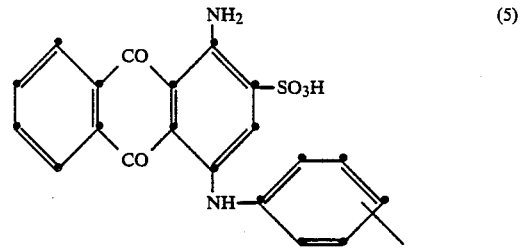

(5)

where the anthraquinone nucleus can be substituted by a further sulfo group and the phenylene radical by alkyl having 1 to 4 C atoms, alkoxy having 1 to 4 C atoms, halogen, carboxyl or sulfo, and the dye preferably contains at least 2 strongly water-solubilizing groups;

(j) reactive dyes according to (e), in which D is the radical of a phthalocyanine dye of the formula preferably a sulfophenylene or ethylene radical, and k is 1 to 3.

Preference is further given to reactive dyes according to (g) or (h), of the following formulae (7) to (15):

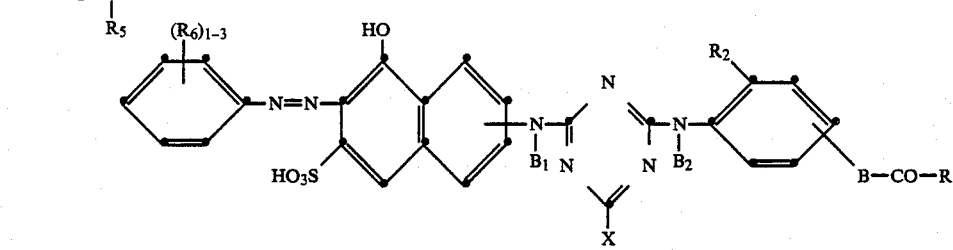
(7)

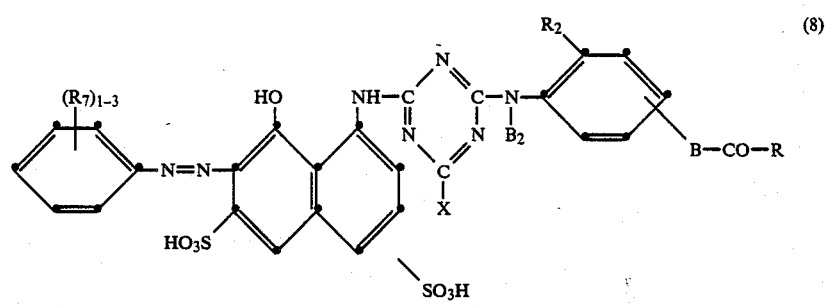
(8)

in which $R_6$ is 1 to 3 substituents from the group consisting of $C_{1-4}$-alkyl, $C_{1-4}$alkoxy, halogen, carboxyl and sulfo, and $B_1$, $B_2$, X, B, R and $R_2$ are as defined under the formula (2);

Pc is the radical of a copper- or nickel-phthalocyanine, W is —OH and/or —$NR_3R_4$, $R_3$ and $R_4$ are independently of each other hydrogen or alkyl which has 1 to 4 carbon atoms and can be substituted by hydroxyl or sulfo, $R_5$ is hydrogen or alkyl having 1 to 4 carbon atoms, E is a phenylene radical which can be substituted by alkyl having 1 to 4 C atoms, halogen, carboxyl or sulfo, or is an alkylene radical having 2 to 6 C atoms, in which $R_7$ is 1 to 3 substituents from the group consisting of $C_{1-4}$-alkyl, $C_{1-4}$alkoxy, halogen, carboxyl and sulfo, and $B_2$, X, B, R and $R_2$ are as defined under the formula (2);

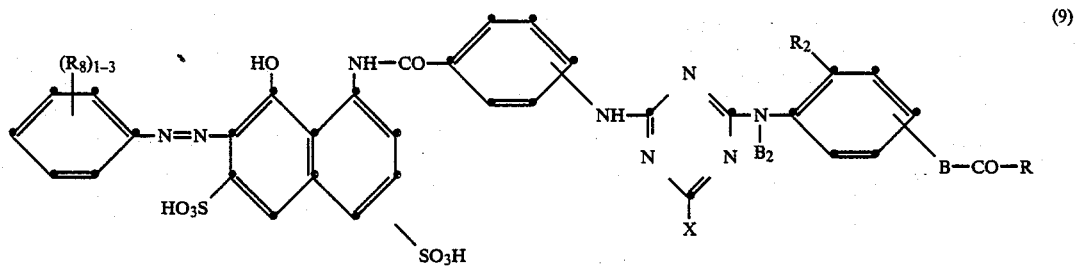
(9)

in which $R_8$ is 1 to 3 substituents from the group consisting of $C_{1-4}$-alkyl, $C_{1-4}$alkoxy, halogen, carboxyl and sulfo, and $B_2$, X, B, R and $R_2$ are as defined under the formula (2);

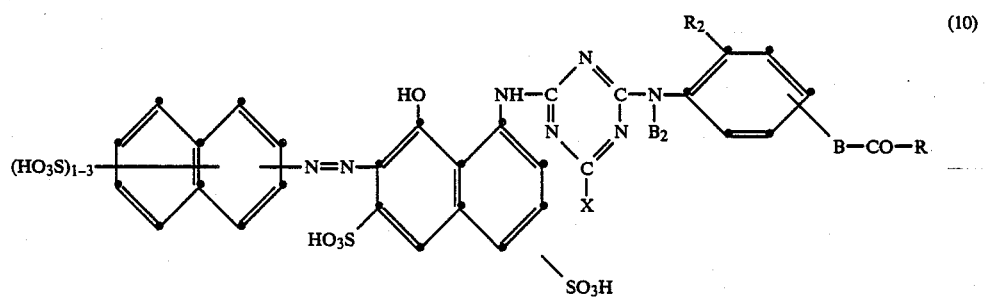
(10)

in which $B_2$, X, B, R and $R_2$ are as defined under the formula (2);

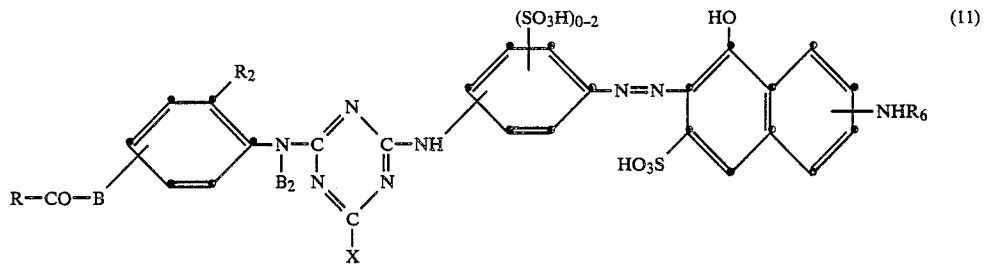

in which $R_9$ is $C_{1-4}$alkanoyl or benzoyl, and $B_2$, X, B, R and $R_2$ are as defined under the formula (2);

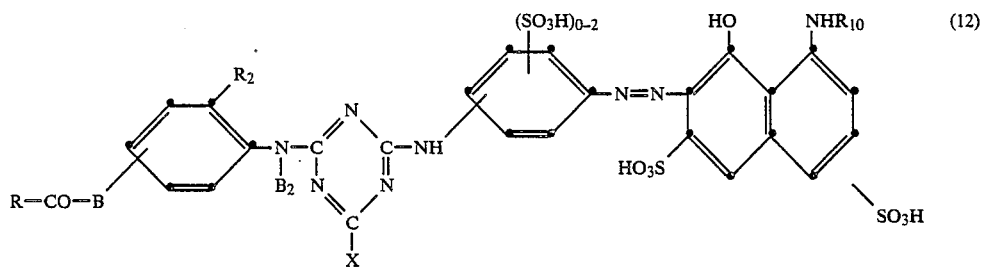

in which $R_{10}$ is $C_{1-4}$alkanoyl or benzoyl, and $B_2$, X, B, R and $R_2$ are as defined under the formula (2);

in which $R_{11}$ is 0 to 3 substituents from the group consisting of $C_{1-4}$-alkyl, $C_{1-4}$alkoxy, halogen, carboxyl and sulfo, and $B_2$, X, B, R and $R_2$ are as defined under the formula (2);

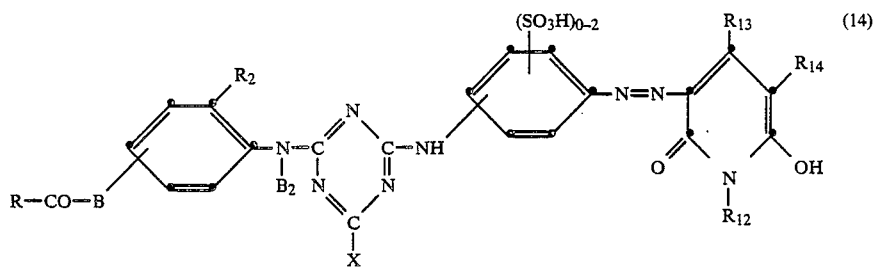

in which $R_{12}$ and $R_{13}$ are independently of each other hydrogen, $C_{1-4}$-alkyl or phenyl, $R_{14}$ is hydrogen, cyano, carbamoyl or sulfomethyl, and $B_2$, X, B, R and $R_2$ are as defined under the formula (2);

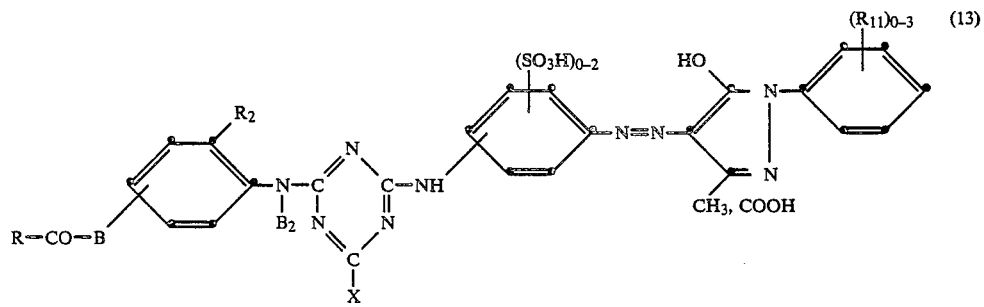

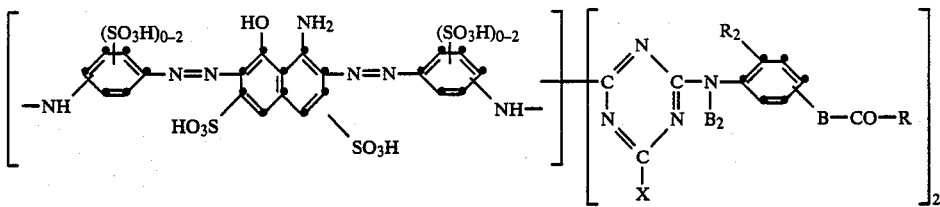

in which $B_2$, X, B, R and $R_2$ are as defined under the formula (2).

Preference is also given to heavy metal complexes of reactive dyes of the formula (1); suitable complexing heavy metals are in particular copper, nickel, cobalt or chromium.

Preference is given in particular to reactive dyes of the formulae (1) to (15) in which Z is a β-sulfatoethyl, β-chloroethyl or vinyl group, or in which X is fluorine or chlorine. Also suitable in particular are combinations of features according to the preceding description, if applicable.

Reactive dyes of the formula (1) are obtained by reacting an organic dye of the formula

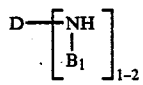

(16)

or a dye precursor, at least one equivalent of an s-triazine of the formula

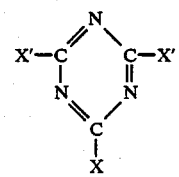

(17)

and at least one equivalent of an amine of the formula

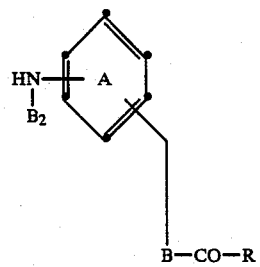

(18)

in any desired order to give a reactive dye of the formula (1), D, $B_1$, $B_2$, B, R and A being as defined under the formula (1), and X and X' independently of each other having one of the meanings mentioned for X under the formula (1), or, if dye precursors are used, converting the intermediates obtained to the desired end dyes.

The molar ratio of starting materials needs to be selected in accordance with the composition of the end product, according to whether one or two amino groups —N($B_1$)H are present in the compound of the formula (16).

If desired, the process according to the invention can be followed by a further conversion reaction. The preparation of the end dyes from precursors comprises in particular couplings which lead to azo dyes.

Since the individual process steps mentioned above can be carried out in various orders, if desired in some instances even simultaneously, different process variants are possible. In general, the reaction is carried out in successive steps, the order of the elementary reactions between the individual reaction components advantageously depending on the particular conditions.

An important process comprises first condensing a dye of the formula

(16)

with a reactive derivative of the s-triazine of the formula

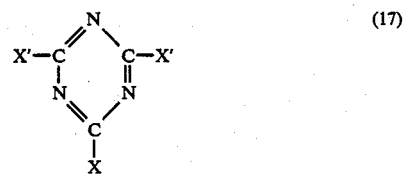

(17)

and then condensing the compound obtained of the formula

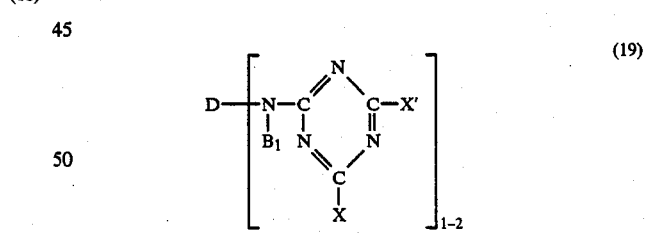

(19)

with an amine of the formula

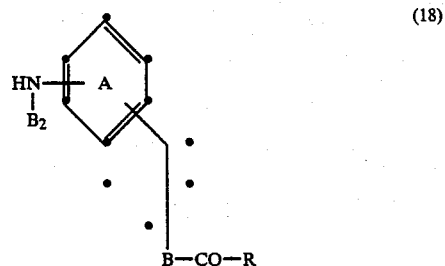

(18)

to give a reactive dye of the formula (1).

In a modified process, reactive dyes of the formula (1) can be prepared by reacting a component of this dye which contains a radical of the formula

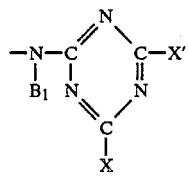
(20)

in which X and X' have the same meanings as for the formula (17), with a second component required for preparing the dye, which can, if desired, contain a radical of the formula (20), and condensing the resulting dye of the formula (19) with an amine of the formula (18).

Effectively, it depends on the structure of the starting material which of the possible process variants produce the best results or under which specific conditions, for example at which condensation temperature, the reaction should be carried out most advantageously.

Since under certain preconditions hydrolysis of the halotriazine radical occurs, it is necessary to hydrolyse an acetylamino-containing intermediate, to remove the acetyl groups, before condensation with a halotriazine. Which reaction is advantageously carried out first, for example the preparation of a secondary condensation product of a compound of the formula (18), the triazine of the formula (17) and the organic dye of the formula (16) or a precursor, that of the triazine with the compound of the formula (18) or that with the organic dye or a precursor of the dye, will vary from case to case and will depend in particular on the solubility of the amino compounds involved and on the basicity of the amino groups to be acylated.

A modified embodiment of the process comprises first preparing a dye which contains a preliminary stage of a reactive radical and subsequently converting this preliminary stage into the final stage, for example by esterification or an addition reaction. For example, a dye in which Z is an HO—CH$_2$CH$_2$—radical can be prepared and, before or after the acylation, the intermediate can be reacted with sulfuric acid, so that the hydroxyl group is converted into a sulfato group; or an analogous dye is used in which Z is an HC$_2$=CH— group and thiosulfuric acid is added onto this intermediate to form an HO$_3$SS—CH$_2$CH$_2$— radical. The sulfation of the hydroxyl group in a dye of the formula (1) or in a suitable precursor is effected for example by reaction with concentrated sulfuric acid at 0° C. to moderately elevated temperature. The sulfation can also be effected by reaction of the hydroxy compound with two equivalents of chlorosulfonic acid per hydroxyl group in a polar organic solvent, for example N-methylpyrrolidone, at 10° to 80° C. Preferably, the sulfation is effected by introducing the compound in question into sulfuric acid monohydrate at temperatures between 5° and 15° C. The introduction of another radical for Z in a compound of the formula (1) or an intermediate in place of a halogen atom or the sulfato group, for example a thiosulfato or phosphato group, is effected in a manner known per se. The preparation via an intermediate of the reactive radical proceeds in many cases uniformly and to completion.

In addition, the synthesis can be followed by elimination reactions. For example, reactive dyes of the formula (1) which contain sulfatoethylsulfonyl radicals can be treated with hydrogen halide eliminators, such as sodium hydroxide, and the sulfatoethylsulfonyl radicals become converted into vinylsulfonyl radicals.

It may also be possible to use a process variant where the starting materials are dye precursors. This variant is suitable for preparing reactive dyes of the formula (1) in which D is the radical of a dye composed of two or more than two components, for example a monoazo, disazo, trisazo, metal complex azo, formazan or azomethine dye.

Generally, the reactive dyes of the formula (1) of all dye classes can be prepared in a manner known per se or analogously to known methods by starting from precursors of or intermediates for dyes which contain fibre-reactive radicals of the formula (1) or by introducing these fibre-reactive radicals into intermediates of dye character which are suitable for this purpose.

Preference is given to reactive dyes of the formula (1) in which D is the radical of a monoazo or disazo dye or of a metal complex azo dye. In this case, the reactive radicals of the formula

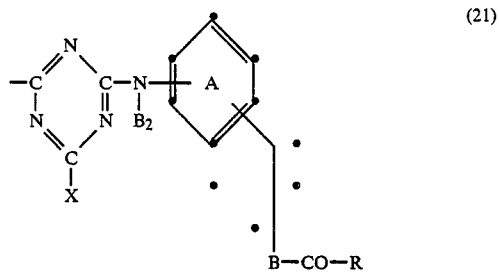
(21)

are bonded to the diazo and/or coupling components. If two radicals of the formula (21) are present in a reactive dye of the formula (1), preferably each radical of the formula (21) is bonded to one component, i.e. to a diazo component or coupling component. The reactive dyes thus have for example the formulae

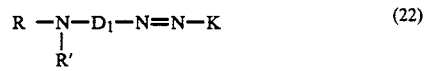
(22)

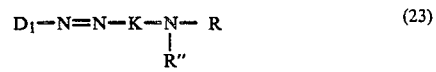
(23)

and

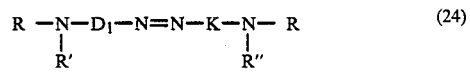
(24)

in which R' and R" are independently of each other defined in the same way as B$_1$ in the formula (1), D$_1$ is the radical of a diazo component, K is the radical of a coupling component, and       is a reactive radical of the formula (21).

If the starting materials are dye precursors, the reactive dyes of the formula (1) are obtained by condensing a component of the dye of the formula (16) containing an —N(B$_1$)H group and a triazine of the formula (17), condensing beforehand or afterwards with a compound of the formula (18), and reacting with the other component of the dye of the formula (16). In the preparation of the preferred azo dyes, the diazo components and the coupling components together need to contain at least one amino group —N(B₁)H and can contain further amino groups. In this case the diazo components used are in particular 1,3-phenylenediamine-4-sulfonic acid, 1,4-phenylenediamine-2-sulfonic acid, 1,4-phenylenediamine-2,5-disulfonic acid and 1,3-phenylenediamine-4,6-disulfonic acid. If desired, it is possible to use corresponding acetylamino or nitro compounds in which the acetylamino or nitro group is converted into an H₂N group, by hydrolysis and reduction respectively, before the condensation with the triazine of the formula (17).

If groups capable of metal complex formation are present in the reactive dyes prepared, such as hydroxyl, carboxyl, amino or sulfo, the reactive dyes can subsequently also be metallized. For example, metal complex azo dyes are obtained by treating azo compounds which have been obtained according to the invention and which contain complexing groups, for example hydroxyl or carboxyl groups, in the ortho-ortho'-position relative to the azo bridge, with heavy metal donor agents before or if desired even after the condensation with a triazine of the formula (17). Of particular interest are copper complexes of reactive dyes of the formula (1). In addition to the method metallization mentioned above, other suitable methods are dealkylating metallization and, for the preparation of copper complexes, oxidative copperring.

The most important process variants are illustrated in the working examples. In what follows, possible starting materials which can be used for preparing the reactive dyes of the formula (1) will be mentioned individually.

Organic dyes of the formula (16)

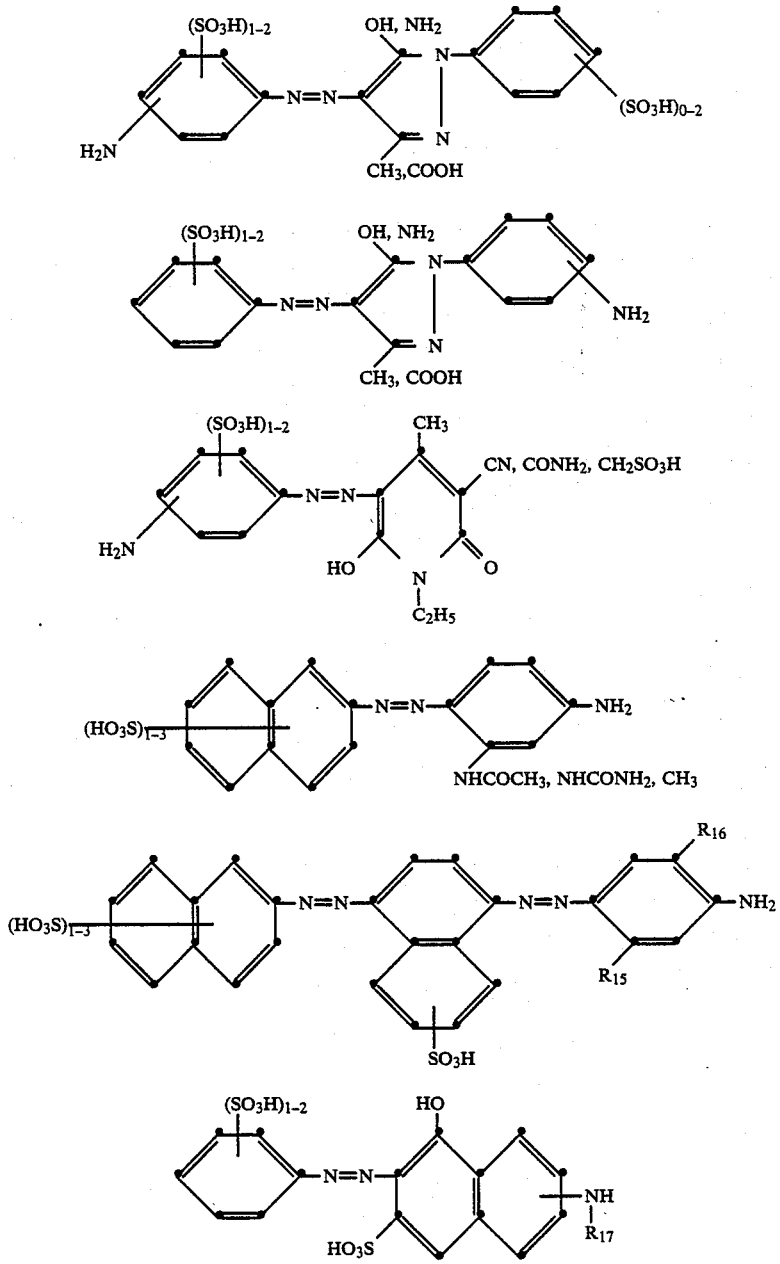

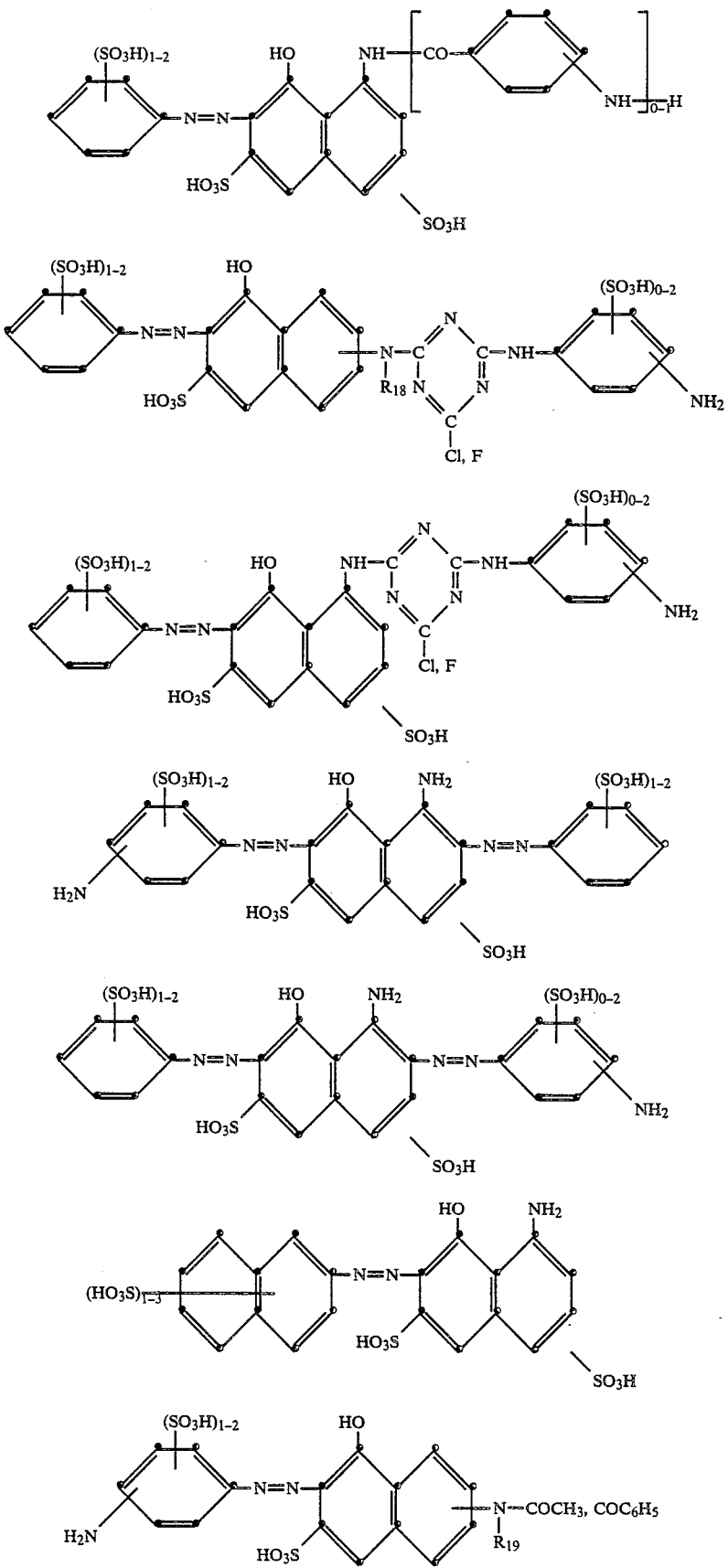

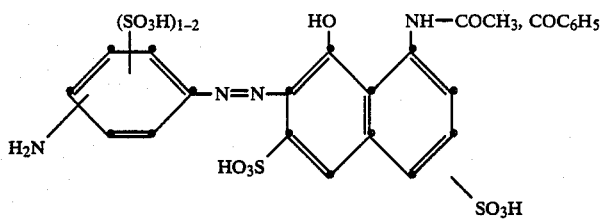
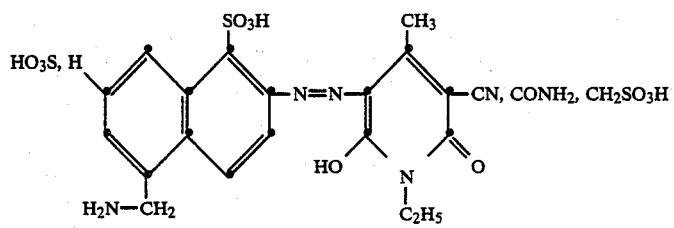
Metal complexes of dyes of the formulae:
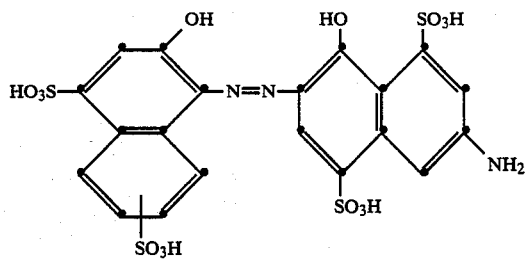
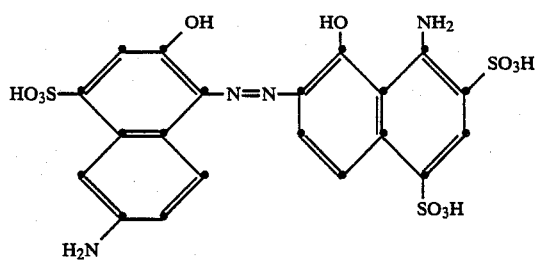
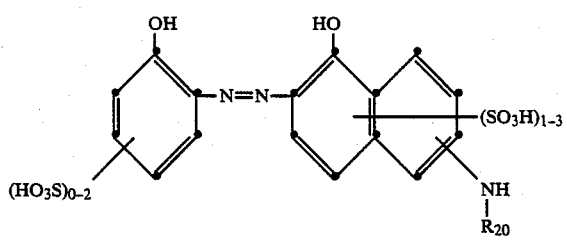
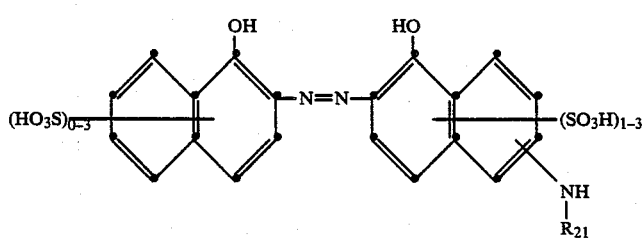

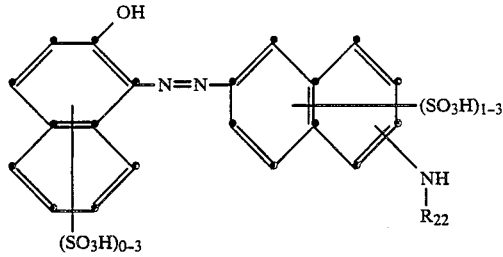

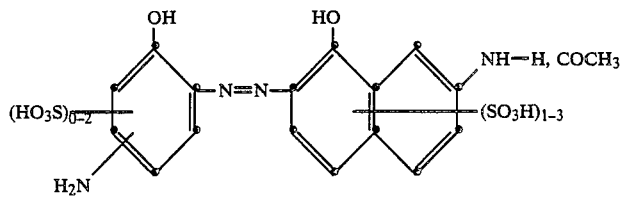

Preferred metal atoms are Cu (1:1 complex) or Cr and Co (1:2 complex). Cr- and Co-complexes can contain the azo compound of the abovementioned formula once or twice, i.e. they can be constructed symmetrically or, using any other desired ligands, asymmetrically.

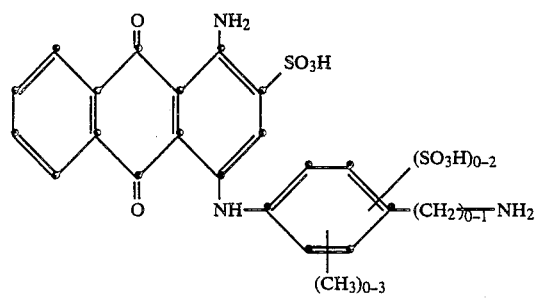

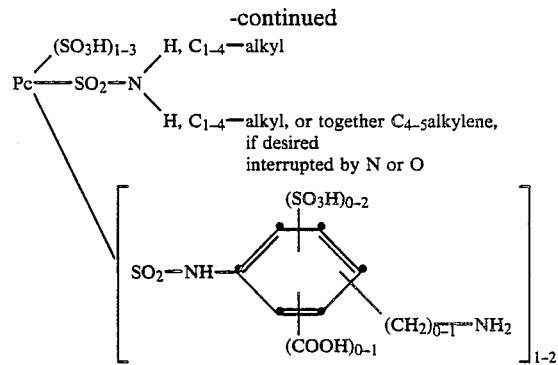

In this formula, Pc is the Cu- or Ni-phthalocyanine radical, the total number of the substituents on the Pc structure being 4.

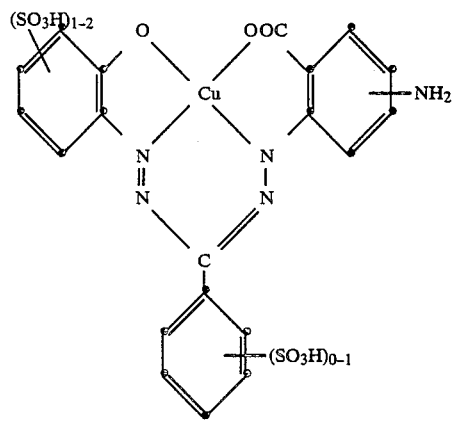

-continued
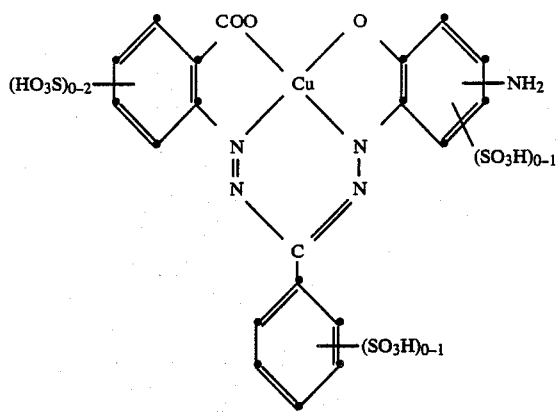
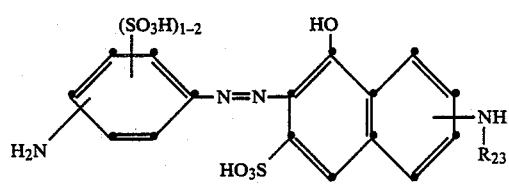
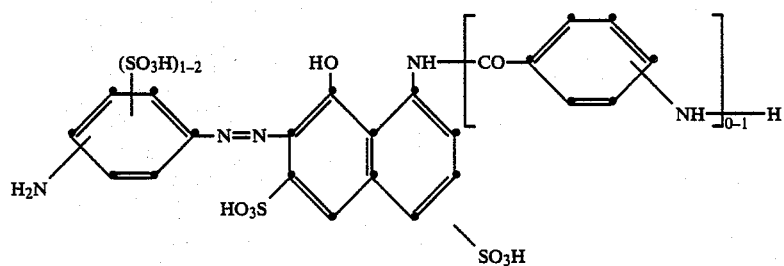
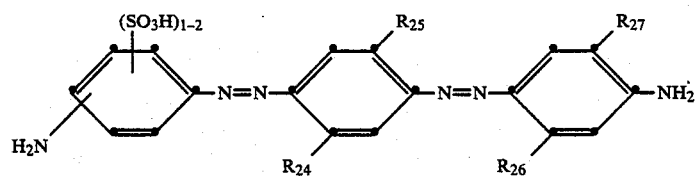
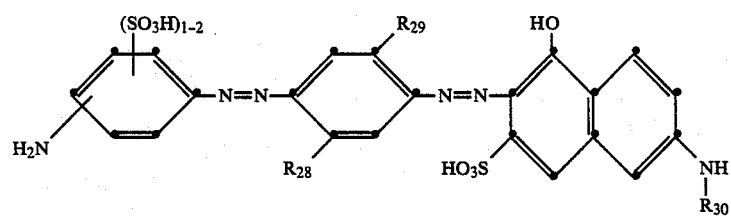
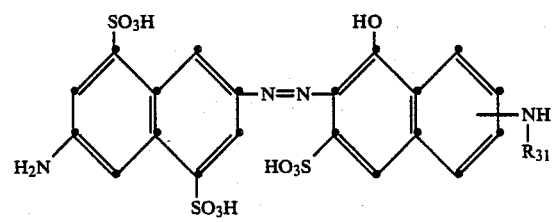

-continued
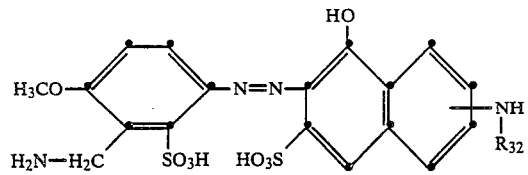
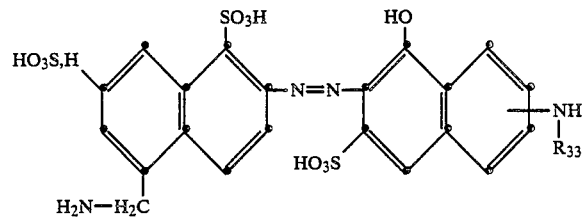
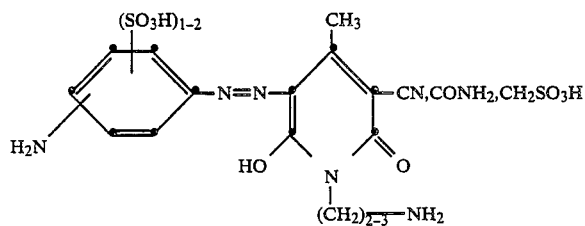
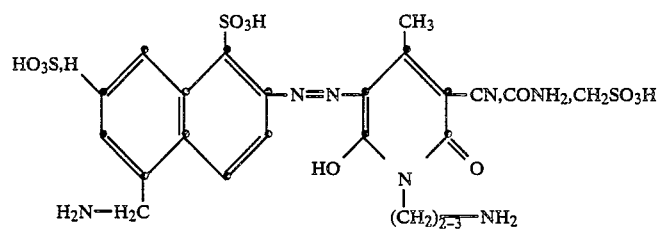
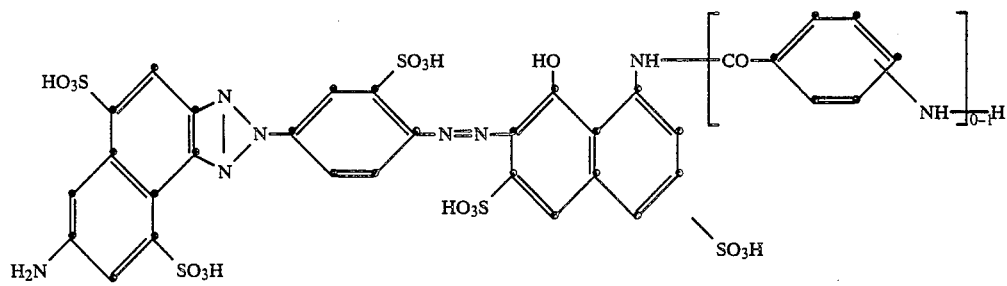
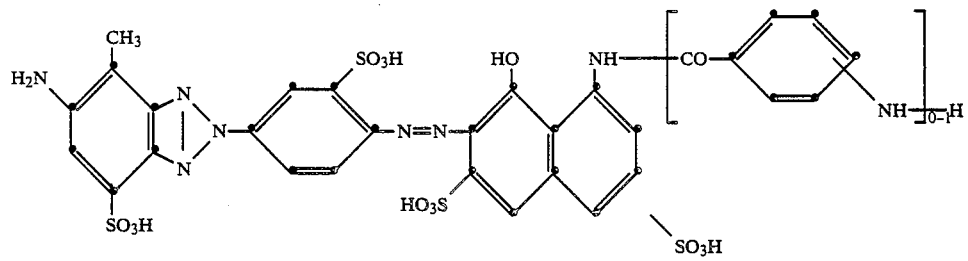
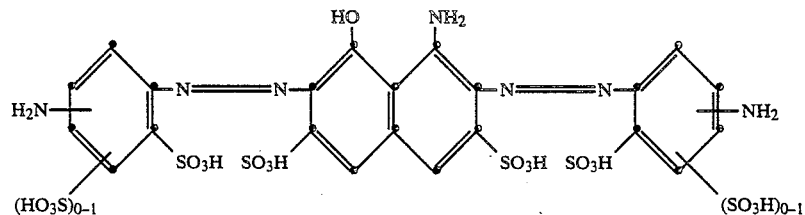

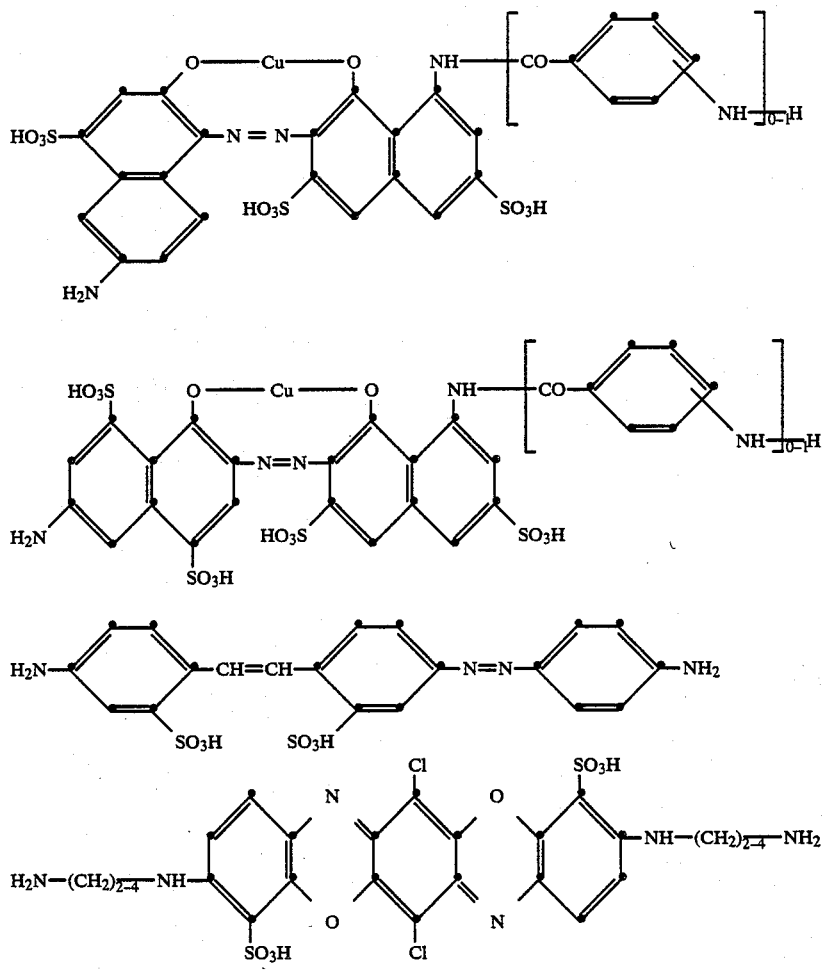

In the formulae shown above, the radicals $R_{17}$ to $R_{\leq}$ and $R_{30}$ to $R_{33}$ are hydrogen or $C_{1-4}$alkyl, and the radicals $R_{15}$, $R_{16}$ and $R_{24}$ to $R_{29}$ are hydrogen, $C_{1-4}$alkyl, $C_{1-4}$alkoxy, $C_{1-4}$alkanoylamino, ureido or halogen, radicals $R_{15}$, $R_{16}$, ... etc. which belong to one and the same formula being independent of one another. Preferably, radicals $R_{17}$ to $R_{23}$ and $R_{30}$ to $R_{33}$ are hydrogen, methyl or ethyl, and the radicals $R_{15}$, $R_{16}$, $R_{24}$ to $R_{29}$ are hydrogen, methyl, ethyl, methoxy, ethoxy, acetylamino, ureido or chlorine. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine; the same is true of the anthraquinones, dioxazines and the like. Preferably, the benzene rings are not further substituted.

Specific diazo and coupling components are:
Diazo components:
Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-amino-biphenyl, 1-aminobenzene-2-, -3- or -4-carboxylic acid, 2-amino-diphenyl ether, 1-aminobenzene-2-, -3-, -4-sulfonamide, -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3-or -4-nitrobenzene, 1-amino-3- or -4-acetylaminobenzene, 1-aminobenzene -2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3-or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2- aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6-or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2'4'-disulfonic acid, 3'-methoxy-4-amino-6-methylazobenzene-2'5'-disulfonic acid 1,3-diaminobenzene, 1,4-diaminobenzne, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (Benzidene), 3,3-dimethylbenzidene, 3,3'-dimethoxybenzidene, 3,3'-dichlorobenzidene, 3,3'-dicarboxybenzidene, 3,3'-dicarboxymethoxybenzidene, 2,2'-dimethylbenzidene, 4,2'-diaminodiphenyl (Diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'diaminostilbene-2,2'disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not a diamine but an aminoacetylamino compound from which the acetyl group is subsequently eliminated again by hydrolysis, as is mentioned above in the explanations of the process variants, the possibilities are the monoacetyl compounds of the abovementioned diazo components, for example 1-acetylamino-3-aminobenzene-4-sulfonic acid or 1-acetylamino-4-aminobenzene-3-sulfonic acid.

Coupling components

Phenol, 1-hydroxy-3- or -4-methylbenzene, 1hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diamino-benzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetyl-aminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfo-2'-naphthyl)-3-methyl-5-pyrazolone, 1-(5',7'-disulfo-2'-naphthyl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxy-ethylamino)-3-cyano-4-methyl-6-aminopyridine, 2,6-bis-(2'-hydroxyethyl-amino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinolone, 1-amino-8-hydroxy-2-(phenylazo)naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6- disulfonic acid, 1-β-aminoethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfo-benzylamino-4-chlorobenzene, 1-amino-3-N,N-disulfobenzylaminobenzene.

Triazines of the formula (17)

2,4,6-Trifluoro-s-triazine (cyanuric fluoride), 2,4,6-trichloro-s-triazine (cyanuric chloride), 2,4,6-tribromo-s-triazine (cyanuric bromide), 2,4,6-trisulfo-s-triazine, 2,4,6-tris-methylsulfonyl-s-triazine, 2,4,6-tris-phenylsulfonyl-s-triazine.

Amines of the formula (18)

They can be prepared by condensing corresponding nitrophenyl- or nitro-phenoxy-alkanoyl chlorides or analogous naphthalene compounds with amines of the formula

H-R    (25)

which correspond to the radicals of the formulae (1a) to (1d), and reducing the nitro group to an amino group.

The reaction is preferably carried out in a high-boiling organic solvent, for example nitrobenzene. The reduction of the nitro group to an amino group is effected in a manner known per se by catalytic hydrogenation with Pd/carbon in ethanol, ethyl acetate or tetrahydrofuran at room temperature to about 40° C. The reduction can also be carried out with Fe/hydrochloric acid or Fe/acetic acid in aqueous solution.

According to another method, described in DE Offenlegungsschrift 2,040,620, the acid chloride can be reacted with an unsaturated aliphatic amine, and 2-mercaptoethanol be added onto the double bond of the acid amide with the aid of catalytic amounts of a free radical former or sulfur at temperatures between 50° C. and 180° C. The hydroxyethyl thioether compounds obtained as a result can also be prepared by condensing the acid chloride with a haloalkylamine and heating the condensation product in alcohol with 2-mercaptoethanol and sodium alkoxide. The thioether compounds are then oxidized to the corresponding sulfones.

The oxidation of the thioether compounds to sulfones can be carried out by various methods, for example with hydrogen peroxide with or without tungsten or vanadium compounds as catalysts, and also with peracetic acid, potassium permanganate or chromic acid, or with chlorine/hydrochloric acid, in each case in an aqueous, aqueousorganic or organic medium.

The carboxamides thus obtainable, where the grouping —SO₂—Z is a β-hydroxyethylsulfonyl group, can be converted, by treatment with sulfating agents, phosphorylating agents, halogenating agents, alkylsulfonic or arylsulfonic acid halides, alkylcarboxylic or arylcarboxylic acid halides or alkylcarboxylic or arylcarboxylic anhydrides, into the corresponding dye precursors where the grouping —SO₂—Z is for example an SO₂—CH₂C—H₂—O—SO₃H, —SO₂—CH₂—CH₂—O—PO₃H₂, —SO₂—CH₂—CH₂—halogen, —SO₂—CH₂—CH₂O—CO—CH₃ or —SO₂—CH₂—CH₂—O—CO—C₆H₅ grouping. The products thus obtained can in turn be converted by treatment with alkaline agents, for example alkali metal hydroxide or alkali metal carbonate, such as sodium hydroxide or sodium carbonate, into corresponding compounds where the grouping —SO₂—Z is a —SO₂—CH=CH₂ grouping.

The products thus obtained can again be converted by reaction (addition) with salts of thiosulfuric acid, such as sodium thiosulfate, into compounds in which the grouping —SO₂—Z is an —SO₂—CH₂—CH₂—S—SO₃H grouping.

Suitable sulfating agents are here for example concentrated sulfuric acid and also chlorosulfonic acid and amidosulfuric acid or other sulfur trioxide donor compounds. Suitable phosphorylating agents are here for example concentrated phosphoric acid, pyrophosphoric acid, metaphosphoric acid, polyphosphoric acid, alkyl polyphosphates, phosphorus oxychloride or mixtures of phosphoric acid and phosphorus(V) oxide. Suitable halogenating agents are for example thionyl chloride and thionyl bromide.

Preference is given to compounds of the formula

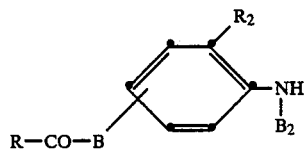    (26)

in which R is a radical of the formula

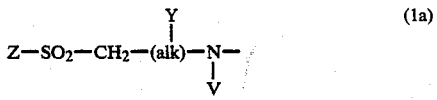    (1a)

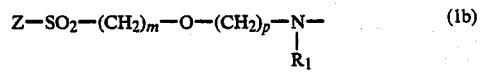    (1b)

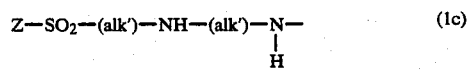    (1c)

or

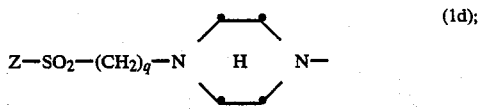    (1d);

$B_2$, B, Z, alk, Y, V, $R_1$, alk', m, p and q are as defined under the formula (1), and $R_2$ is hydrogen, $C_1$-$C_4$alkyl, $C_1$-$C_4$alkoxy, halogen, hydroxyl, carboxyl or sulfo. In the compounds of the formula (26), preferably $B_2$ is methyl, ethyl, isopropyl or in particular hydrogen, $R_2$ is methyl, methoxy, chlorine, hydroxyl, carboxyl, sulfo or in particular hydrogen, B is methylene or methyleneoxy, R is one of the abovementioned radicals of the formulae (1a) to (1d).

The preferred process for preparing the compounds of the formula (26) comprises condensing a compound of the formula

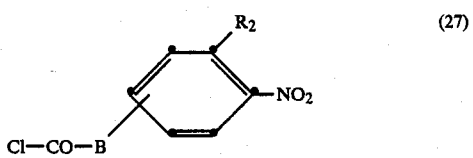    (27)

with an amine of the formula

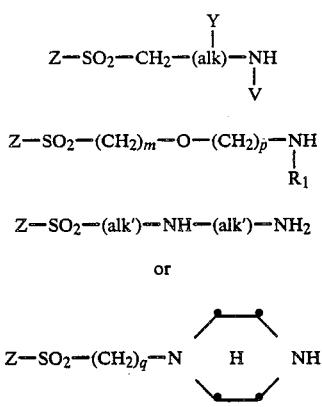

$$Z-SO_2-CH_2-(alk)-\underset{V}{NH} \quad (28a)$$

$$Z-SO_2-(CH_2)_m-O-(CH_2)_p-\underset{R_1}{NH} \quad (28b)$$

$$Z-SO_2-(alk')-NH-(alk')-NH_2 \quad (28c)$$

or $$Z-SO_2-(CH_2)_q-N\diagup\diagdown H \quad NH \quad (28d)$$

and reducing the nitro group to an amino group.

In a modified version of the process described above, compounds of the formula (26) can also be prepared by condensing a compound of the formula (27) with an amine of the formula

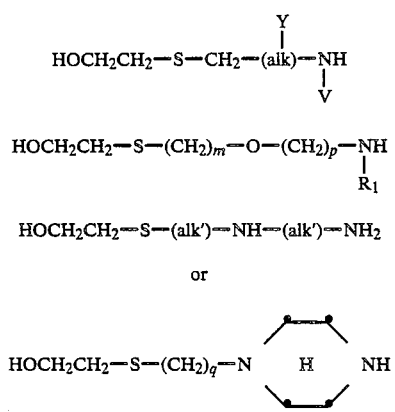

$$HOCH_2CH_2-S-CH_2-(alk)-\underset{V}{NH} \quad (29a)$$

$$HOCH_2CH_2-S-(CH_2)_m-O-(CH_2)_p-\underset{R_1}{NH} \quad (29b)$$

$$HOCH_2CH_2-S-(alk')-NH-(alk')-NH_2 \quad (29c)$$

or $$HOCH_2CH_2-S-(CH_2)_q-N\diagup\diagdown H \quad NH \quad (29d)$$

oxidizing the condensation product with elemental chlorine to the corresponding β-chloroethylsulfonyl compound, and reducing the nitro group to an amino group.

In another possible process variant, first a compound of the formula (27) is condensed with one of the amines of formulae (29a) to (29d). The product obtained is oxidized with a peroxide to a sulfone, the nitro group is then reduced to an amino group, the amino compound obtained is condensed with an s-triazine of the formula (17) or a compound of the formula (19), and finally the hydroxyl group in the radical of one of the amines of the formulae (29a) to (29d) is sulfated.

The condensation of the compound of the formula (27) with the amines of the formulae (29a) to (29d) is carried out for example in chloroform at room temperature and in the presence of alkaline, acid-binding agents, for example alkali metal hydroxides, alkali metal carbonates or alkali metal bicarbonates. The condensation product is then oxidized with a chlorine/hydrochloric acid mixture in a manner known per se. The reduction of the nitro group to an amino group is carried out as described above.

The amines of the formulae (28a) to (29d) used as starting compounds can be prepared analogously to the method of Example 1 of DE Offenlegungsschrift 2,614,550.

The condensation of the s-triazine of the formula (17), in particular of a 2,4,6-trihalo-s-triazine, with the organic dyes of the formula (16) or with the diazotizable and/or couplable components containing an —N(B$_1$)H group is preferably effected in aqueous solution or suspension, at low temperatures, for example between 0° and 5° C. and at a weakly acidic, neutral to weakly alkaline pH. Advantageously, the hydrogen halide freed in the course of condensation is continuously neutralized by adding aqueous alkali metal hydroxides, alkali metal carbonates or alkali metal bicarbonates. For further reaction of the halotriazine dyes thus obtained, or for the reaction of the 2,4,6-trihalo-s-triazine with the compounds of the formula (18), the free amines or salts thereof, preferably in the form of the hydrochloride, are used. The reaction is carried out at temperatures between about 0° and 40° C., preferably between 5° and 25° C., in the presence of acidbinding agents, preferably sodium carbonate, within a pH range from 2 to 8, preferably 5 to 6.5.

The condensation of the halotriazine with a compound of the formula (18) can be carried out before or after the condensation of the halotriazine with a dye of the formula (16). The condensation of the halotriazine with a compound of the formula (18) is preferably carried out in aqueous solution or suspension, at low temperature and at weakly acid to neutral pH. Here, too, the hydrogen halide freed in the course of the condensation is advantageously neutralized by uninterrupted addition of aqueous alkali metal hydroxides, alkali metal carbonates or alkali metal bicarbonates.

The diazotization of the diazo components, or of the intermediates containing a diazotizable amino group, is effected in general by the action of nitrous acid in aqueous mineral acid solution at low temperature. The coupling onto the coupling component takes place at strongly acid, neutral or weakly alkaline pH.

The reactive dyes of the formula (1) are suitable for dyeing and printing a very wide range of materials, such as silk, leather, wool, polyamide fibres and polyurethanes, and in particular cellulose-containing fibre materials of any kind. Such fibre materials are for example the natural cellulose fibres, such as cotton, linen and hemp, and also cellulose pulp and regenerated cellulose. The reactive dyes of the formula (1) are also suitable for dyeing or printing hydroxyl-containing fibres which are present in blend fabrics, for example mixtures of cotton with polyester fibres or polyamide fibres.

The dyes according to the invention can be applied to the fibre material and fixed on the fibre in various ways, in particular in the form of aqueous dye solutions and print pastes. They are suitable not only for the exhaust method of dyeing but also for dyeing by the padding method, whereby the material is impregnated with aqueous, optionally salt-containing dye solutions and the dyes are fixed after an alkali treatment or in the presence of alkali, if desired by heating. They are likewise suitable for the cold pad-batch process, whereby the dye is applied together with the alkali on a pad-mangle and is then fixed by storing for several hours at room temperature. After fixing, the dyeings and prints are thoroughly rinsed with cold and hot water, in the presence or absence of an agent which has a dispersing action and promotes the diffusion of the unfixed portions.

If the reactive dyes of the formula (1) in which D is the radical of an anthraquinone dye are insufficiently soluble in the alkaline dyeing liquor, this defect can be remedied in a manner known from the literature, namely by adding dispersants or other non-colored compounds, for example a naphthalenesulfonic acid/formaldehyde condensate or in particular anthraquinone-2-sulfonic acid.

The reactive dyes of the formula (1) are distinguished by high reactivity and good fixing properties and very good build-up. They can therefore be used for exhaustive dyeing at low dyeing temperatures and require only short steaming times in the pad-stream process. The degrees of fixation are high, and the unfixed portions can easily be washed off, the difference between the degree of exhaustion and the degree of fixation being remarkably small, i.e. the soaping loss being very small. The reactive dyes of the formula (1) are also suitable for printing, in particular on cotton, but also for printing nitrogen-containing fibres, for example wool, silk or wool- or silk-containing blend fabrics.

The dyeings and prints prepared with the dyes according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness.

The examples which follow serve to illustrate the invention. The temperatures are given in degrees celsius, and parts and percentages are by weight, unless otherwise stated. Parts by weight relate to parts of volume as the kilogram relates to the liter.

The preparation of the monoazo or disazo intermediate compounds has not been described in all cases in the working examples below, but it will be readily apparent from the general description.

EXAMPLE 1

A solution of 48.3 parts of 1-(4'-sulfophenyl)-3-carboxy-4-(4'-amino-2'-sulfophenylazo)-5-pyrazolone in 750 parts of ice-water is reacted at 0° to 2° C. in pH 5 with 14 parts of cyanuric fluoride. As soon as free amino groups are no longer detectable, 37 parts of 1-amino-4-β-(β'-chloroethylsulfonyl)-ethylaminocarbonylmethoxybenzene hydrochloride are added and reacted at 0° to 20° C. and pH 5 to 7. The dye obtained after precipitation with potassium chloride and gentle drying dyes cotton in fast golden yellow shades. It conforms to the formula

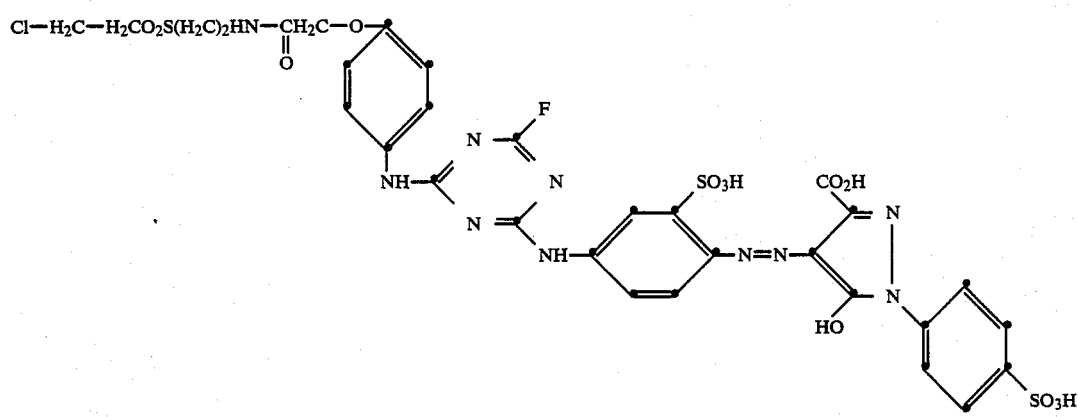

EXAMPLE 2

The condensation product of 18.8 parts of 1,3-phenylenediamine-4-sulfonic acid and 19 parts of cyanuric chloride is diazotized in hydrochloric acid solution, 28.5 parts of 1-(4'-sulfophenyl)3-carboxy-5-pyrazolone are added, and coupling is carried out at pH 5 to 7. After addition of a solution of 45 parts of 1-amino-4-β-(β'-chloroethylsulfonyl)-ethylaminocarbonylmethoxybenzene-3-sulfonic acid hydrochloride the temperature is raised to 40° C. and a pH of 7.5 is set. After the condensation has ended, the dye is precipitated with potassium chloride from neutral solution and gently dried. It dyes cotton in fast yellow shades and conforms to the formula

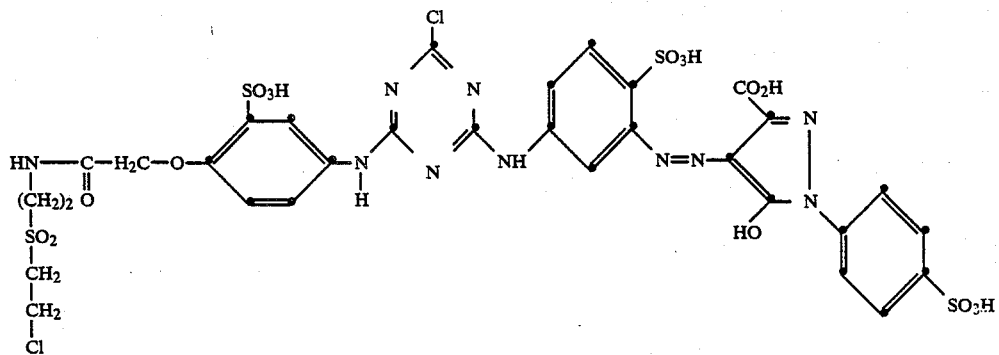

EXAMPLE 3

The condensation product of 18.8 parts of 1,3-phenylenediamine-4-sulfonic acid and 19 parts of cyanuric chloride is diazotized in hydrochloric acid solution, 28.5 parts of 1-(4'-sulfophenyl)-3-carboxy-5-pyrazolone are added, and coupling is carried out at pH 5 to 7. After addition of a solution of 34 parts of 1-amino-4-β-(β'-chloroethylsulfonyl)-ethylaminocarbonylmethylbenzene hydrochloride the temperature is raised to 40° C. and a pH of 7.5 is set. After the condensation has ended, the dye is precipitated with potassium chloride from neutral solution and gently dried. It dyes cotton in fast yellow shades and conforms to the formula

EXAMPLE 5

30.3 parts of 2-aminonaphthalene-4,8-disulfonic acid are diazotized in the presence of hydrochloric acid and coupled onto 15 parts of 3-acetylaminoaniline. Acylation with 14 parts of cyanuric fluoride at 0° to 2° C. and pH 6 - 7 is followed by reaction with at 20° C. and pH 6 to 7 with 45 parts of 1-amino-4-β-(β'-chloroethylsulfonyl)ethylaminocarbonylmethoxybenzene-3-sulfonic acid hydrochloride, vinylation at pH 10.0 and room temperature in the course of 15 minutes, and then resetting the pH to 7.0 and salting out with potassium chloride. The dye obtained on gentle drying dyes cotton in fast reddish yellow shades and conforms to the formula

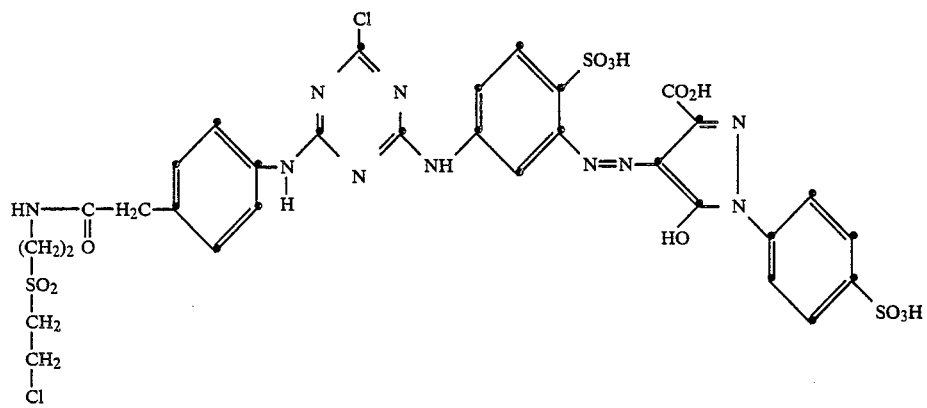

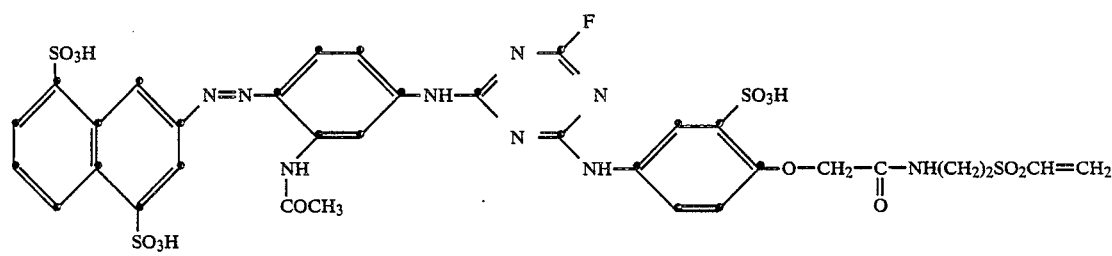

EXAMPLE 4

30.3 parts of 2-aminonaphthalene-4,8-disulfonic acid are diazotized in the presence of hydrochloric acid and coupled onto 15 parts of 3-acetylaminoaniline. Acylation with 19 parts of finely divided cyanuric chloride is followed by 20° C. and pH 6 to 7 by reaction with 37 parts of 1-amino-3-β-(β'-chloroethylsulfonyl)-ethylaminocarbonylmethoxybenzene hydrochloride and salting out with potassium chloride. The dye obtained on gentle drying dyes cotton in fast reddish yellow shades and conforms to the formula

EXAMPLE 6

50.3 parts of the dye 2-amino-5-hydroxy-2-(2,5-disulfonylbenzeneazo)-naphthalene-7-sulfonic acid are dissolved in 800 ml of water under neutral conditions, and the solution is cooled down to 0° to 5° C. At this temperature, 14.2 parts of cyanuric fluoride are added dropwise in the course of 20 minutes, during which the pH of the reaction solution is maintained at 6 to 6.5. After addition of 34 parts of 1-amino-4-β-(β'-chloroethylsulfonyl)-ethylaminocarbonylmethylbenzene hydrochlo-

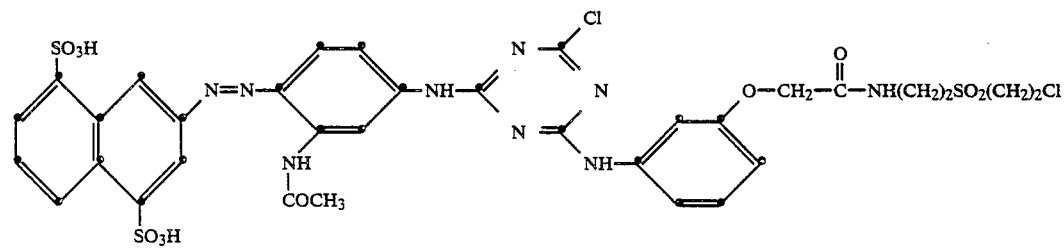

ride in 100 ml of water, the temperature is raised to 20° to 25° C. and the pH is maintained at 5.5 to 6.5.

Reaction time about 2 hours.

To separate off the dye, the neutral solution is treated with 10% of sodium chloride and 10% of potassium chloride and filtered. The paste obtained is dried at 40° to 50° C. in vacuo. The reactive dye thus prepared has the following constitution:

and diazotized in a conventional manner. The diazo compound is then run at 0° to 5° C. into a mixture of 56.2 parts of 2-acetamino-5-naphthol-7-sulfonic acid, which has been dissolved in 300 parts of water under neutral conditions, 25 parts of sodium hydrogencarbonate and 150 parts of ice. The pH is initially 6.5 but rises on prolonged stirring to 7.5 to 7.8. After the coupling has ended, 60 parts of 10-normal sodium hydroxide

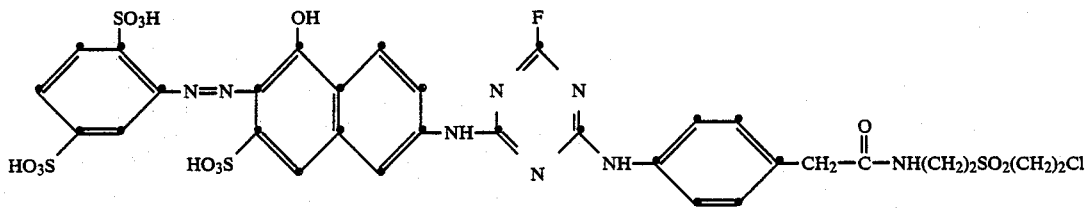

EXAMPLE 7

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled down to 0° to 5° C. At this temperature, 18.4 parts of cyanuric chloride are added dropwise in the course of 20 minutes, during which the pH of the reaction solution is maintained at 6 to 6.5 by simultaneous addition of 2 N sodium hydroxide solution. After addition of 37 parts of 1-amino-4-β-(β'-chloroethylsulfonyl)-ethylaminocarbonylmethoxybenzene hydrochloride in 100 ml of water, the temperature is raised to 20° to 25° C. and the pH maintained at 5.5 to 6.5. Reaction time about 2 hours.

To separate off the dye, the neutral solution is treated with 10% of sodium chloride and 10% of potassium chloride, and filtered. The paste obtained is dried at 40° to 50° C. in vacuo. The reactive dye thus prepared has the following constitution:

solution are added, and a temperature of 90° C. is maintained for 2 hours to hydrolyse the acetamino group. The alkaline solution of the orange intermediate dye is neutralized with about 22 parts of 10-normal hydrochloric acid, treated with 20% of sodium chloride and 15% of potassium chloride, stirred for some time and filtered.

EXAMPLE 8

47 parts of the known aminodisazo compound of the formula

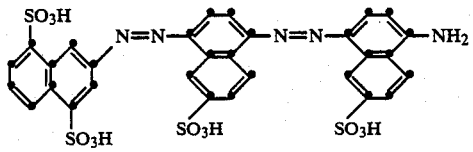

are dissolved in 300 parts of volume of water at pH 6.5 and reacted at 0° to 5° C. with 10 parts of cyanuric

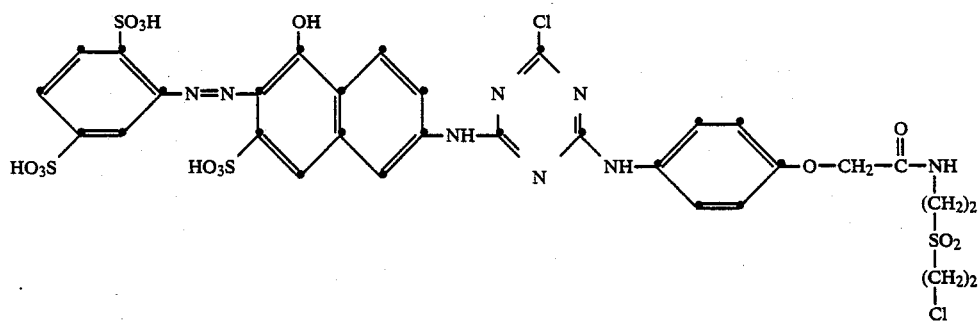

The starting dye, 2-amino-5-hydroxy-6-(2',5'-disulfophenylazo)-naphthalene-7-sulfonic acid, required for preparing the dye according to the invention can be obtained as follows:

50.6 of 2-amino-benzene-1,4-disulfonic acid are dissolved in 120 parts of water under neutral conditions chloride. The product formed is then made to react as pH 6 to 7 and 20° to 25° C. with 18 parts of 1-amino-4-β-(β'-chloroethylsulfonyl)-ethylaminocarbonylmethoxy-benzene hydrochloride. Precipitation with 80 parts of potassium chloride gives the dye of the formula

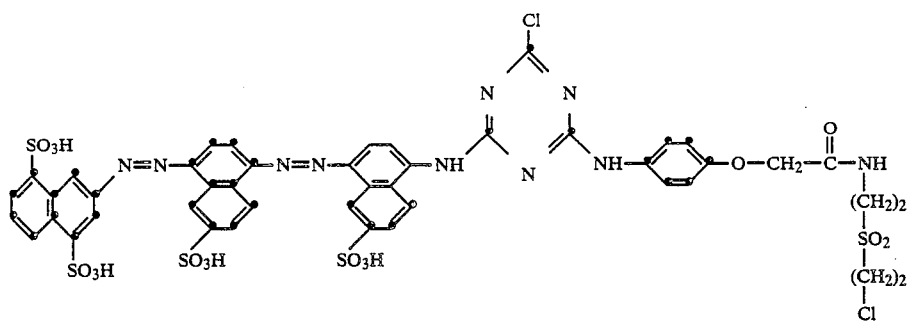

which dyes cotton in fast reddish brown shades.

EXAMPLE 9

95 parts of cyanuric chloride are reacted in known manner with 1-amino-8-hydroxynaphthalene-3,6-disulfonic acid in water. To this product are added a freshly diazotized solution of 1-aminobenzene-2-sulfonic acid, and the pH is adjusted to 4 to 4.5. After the coupling has ended, 1 part of 1-amino-4-β-(β'-chloroethylsulfonyl)ethylaminocarbonylmethylbenzene hydrochloride is added and made to react at pH 7 to 7.5 and 35° C. Salting out the KCl gives 420 parts of the dye of the formula

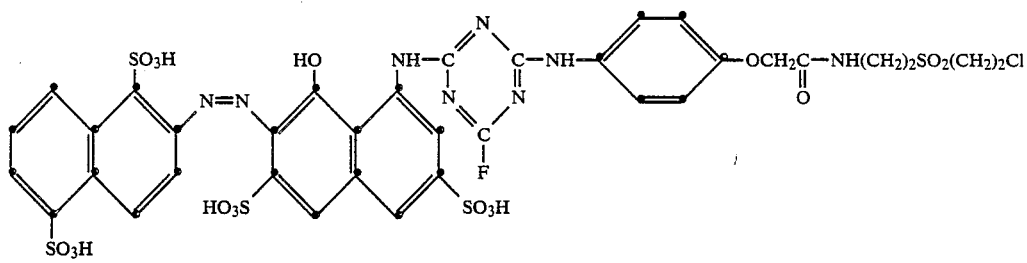

which dyes cotton in fast bright red shades.

EXAMPLE 10

16 parts of 1-amino-8-hydroxynaphthalene-3,6-disulfonic acid are dissolved in 400 parts of water under neutral conditions.

The reaction solution is brought to pH 4.5, and 7.0 parts of cyanuric fluoride are added dropwise with through stirring at 0° to 3° C. The hydrogen fluoride which is freed in the course of addition is neutralized by metered addition of 2N sodium hydroxide solution. As soon as free 1-amino-8-hydroxynaphthalene-3,6-disulfonic acid is no longer detectable, 18 parts of 1-amino-4-β-(β'-chloroethylsulfonyl)-ethylaminocarbonylmethoxybenzene hydrochloride in 50 parts of water are added. The temperature is allowed to rise to 20° to 25° C., and the pH of the reaction solution is maintained at 4 to 4.5. After the condensation has ended, the dye intermediate is coupled at 0° to 10° C. with 15 parts of diazotized 2-aminonaphthalene-1,5-disulfonic acid. At a final pH of 6.5 to 7 the dye of the formula

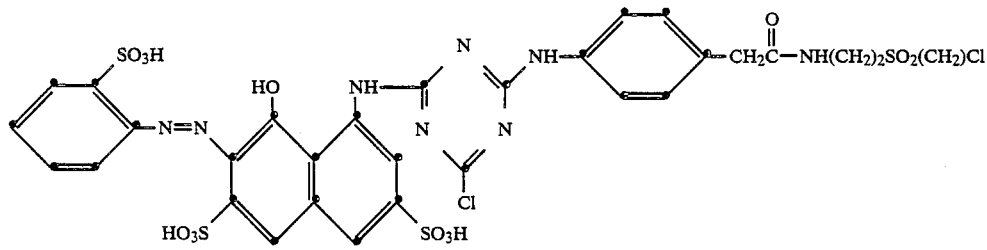

is salted out with sodium chloride, filtered off, washed and dried in vacuo. It is a dark red powder and dyes cotton and regenerated cellulose in bluish red shades of good wet, rub and light fastness.

EXAMPLE 11

16 parts of 1-amino-8-hydroxynaphthalene-4,6-disulfonic acid are dissolved in 400 parts of water under neutral conditions. The reaction solution is brought to pH 4.5, and 7.0 parts of cyanuric fluoride are added dropwise with through stirring at 0° to 3° C. The hydrogen fluoride which is freed in the course of addition is neutralized by metered addition of 2N sodium hydroxide solution. As soon as free 1-amino-8-hydroxynaphthalene-3,6-disulfonic acid is no longer detectable, 23 parts of 1-amino-4-β-(β'-chloroethylsulfonyl)-ethylaminocarboylmethoxybenzene hydrochloride in 50 parts of water are added. The temperature is allowed to rise to 20° to 25° C., and the pH of the reaction solution is maintained at 4 to 6.5. After the condensation has ended, the dye intermediate is coupled to 0° to 10° C. with 11 parts of diazotized 2-aminobenzenesulfonic acid. At a final pH of 6.5 to 7 the dye of the formula

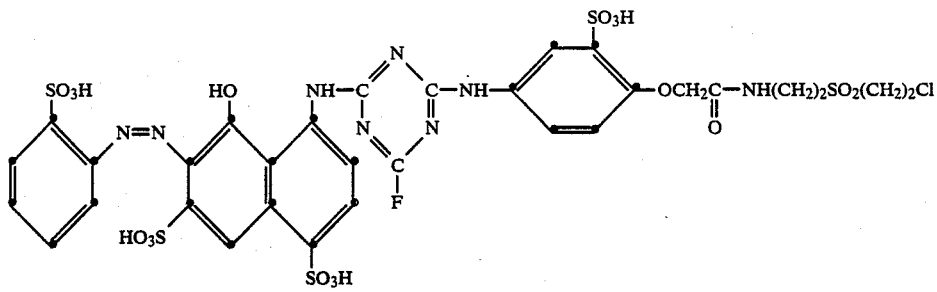

15 is salted out with sodium chloride, filtered off, washed and dried in vacuo. It is a dark red powder and dyes cotton and regenerated cellulose in yellowish red shades of good wet, rub and light fastness.

EXAMPLE 12

3-Aminoacetanilide-4-sulfonic acid is diazotized in a conventional manner and coupled onto 1-benzoylamino-8-hydroxynaphthalene-3,6-disulfonic acid; the acetyl group is then selectively hydrolysed under alkaline conditions. The chromophore is then reacted with 2,4,6-trifluoro-1,3,5-triazine as described in Example 1. Replacement of fluorine by the radical of 1-amino-4-$\beta$-($\beta'$-chloroethylsulfonyl)-ethylaminocarbonylmethoxybenzene hydrochloride gives a dye of the formula

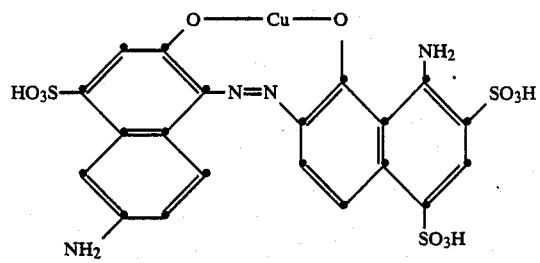

are suspended in 700 parts of water, and reacted first with 19 parts of cyanuric chloride at 0° to 50° C./pH 2 to 3 finally with 34 parts of 1-amino-4-$\beta$-($\beta'$-chloroethylsulfonyl)-ethylaminocarbonylmethylbenzene hydrochloride at pH 6 to 7/20° C. The dye is isolated by spraydrying the solution. 90 parts are obtained of the dye of the formula

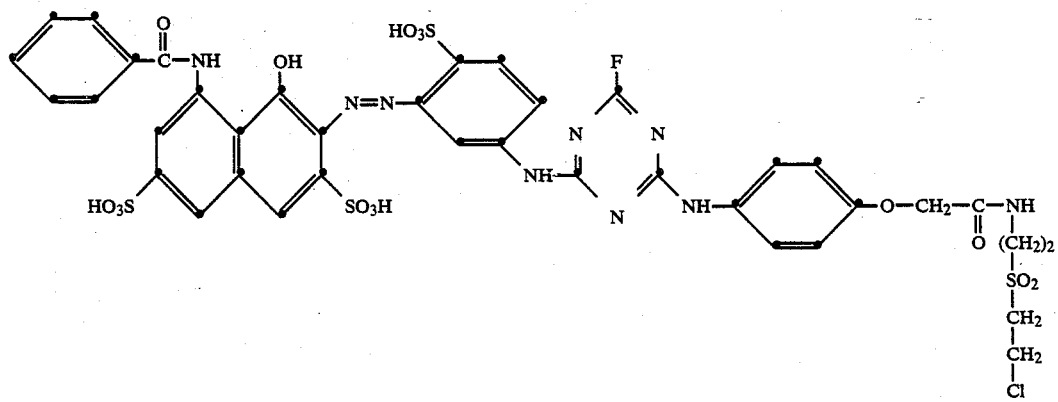

60 which dyes cotton in fast brilliant red shades.

EXAMPLE 13

64.8 parts of the known dye of formula

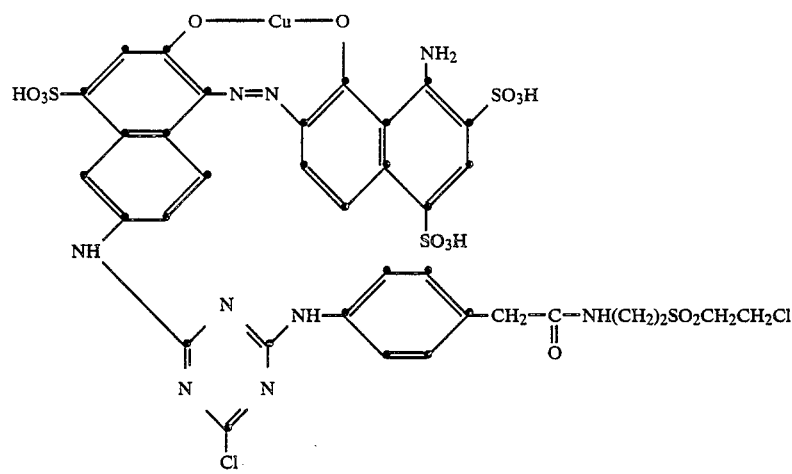

EXAMPLE 14

26 parts of the known dye of the formula

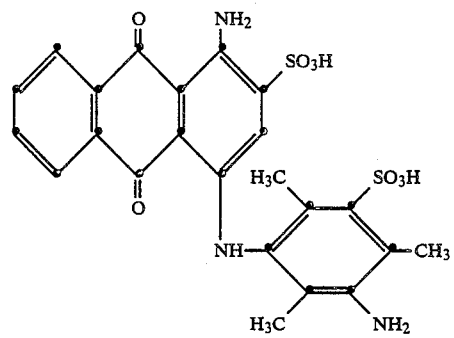

are reacted at 0° to 5° C. and pH 2 to 3 in water having 10 parts of cyanuric chloride and then with 24 g of 1-amino-4-β-(β'-chloroethylsulfonyl)-ethylaminocarbonylmethoxybenzene hydrochloride (temperature 20° to 25° C.; pH 6.0 to 7.0). The resulting dye of the formula can be isolated by salting out with potassium chloride, and dyes cotton, in particular by printing, in very lightfast bright blue shades.

EXAMPLE 15

To 17.3 parts of aniline-4-sulfonic acid diazotized in the presence of hydrochloric acid are added at 5° C. 31.6 parts of a suspension of 1-amino-8-hydroxynaphthalene-3,6-disulfonic acid in 300 parts of water. Coupling is carried out overnight at pH 1 to 2, and 38.6 parts of a suspension of the diazo product, from diazotization in the presence of hydrochloric acid of the primary condensation product of cyanuric chloride and 1,3-phenylenediamine-4-sulfonic acid, are then added. Coupling is completed under weakly acid conditions by adding 17.8 parts of sodium carbonate; a solution of 36 parts of 1-amino-4-β-(β'-chloroethylsulfonyl)-ethylaminocarbonylmethoxybenzene hydrochloride is then added, and condensing is carried out at 20° to 30° C. and a pH of 7 to 7.5. The dye is precipitated from neutral solution by addition of potassium chloride and gently dried to leave a black powder which dyes cotton in fast navy shades.

The dye conforms to the formula

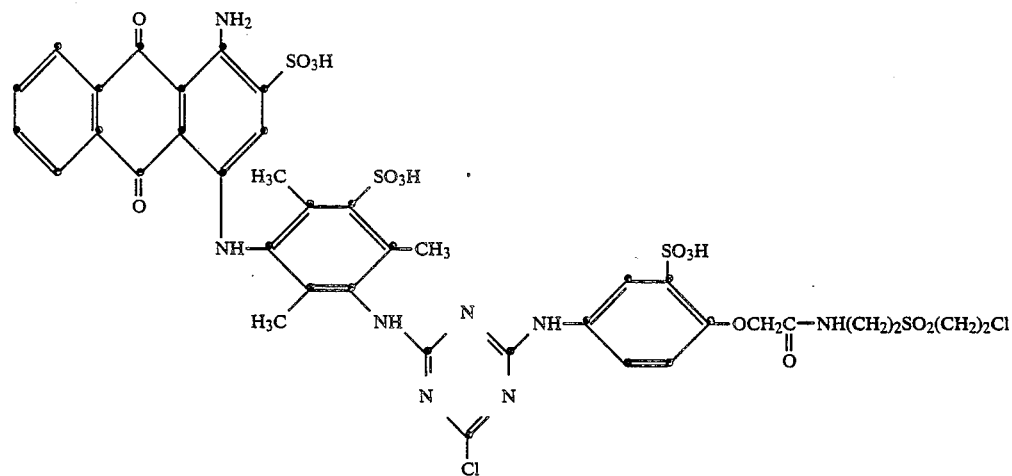

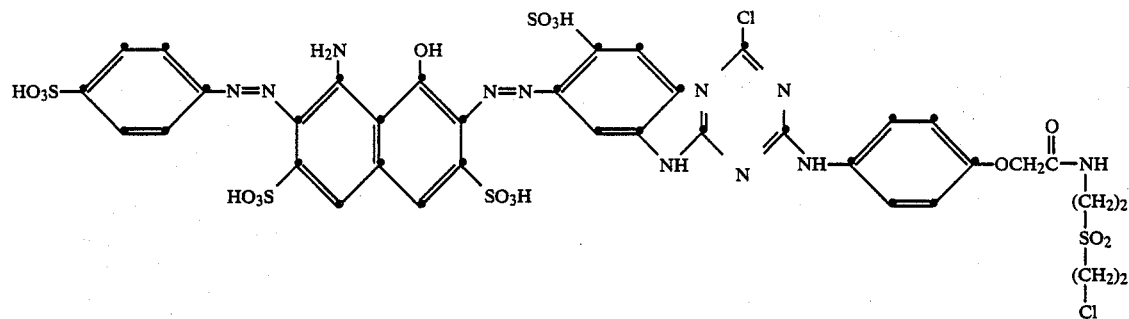

EXAMPLE 16

To 21.6 parts of a 3-aminoacetanilide-4-sulfonic acid diazotized in the presence of hydrochloric acid are added at 5° C. 31.6 parts of a suspension of 1-amino-8-hydroxynaphthalene-3,6-disulfonic acid in 300 parts of water. Coupling is carried out overnight at pH 1 to 2, and 17.3 parts of a suspension of aniline-4-sulfonic acid are diazotized in the presence of hydrochloric acid are then added. Coupling is completed under weakly acid conditions by addition of 17.8 parts of sodium carbonate; this is followed by alkaline hydrolysis at 80° C. for 2 hours. The chromophore is isolated and condensed at 0° to 2° C./pH 6 to 7 with 14 parts of cyanuric fluoride. 36 parts of 1-amino-4-β-(β'-chloroethylsulfonyl)-ethylaminocarbonylmethoxybenzene hydrochloride are then added, and condensing is carried out at 0° to 20° C./pH 6 to 7 for 2 hours. The dye is precipitated from neutral solution by addition of potassium chloride and gently dried to leave a black powder which dyes cotton in fast navy shades.

The dye conforms to the formula

EXAMPLE ƒ

15.8 parts of a compound of the formula

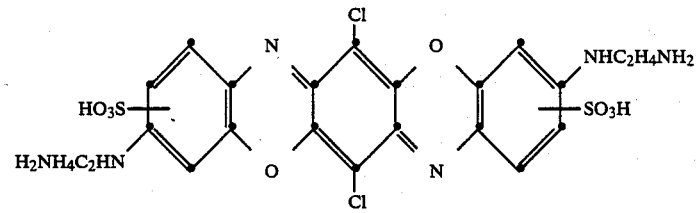

are heated to 45° C. with 1500 parts of water, the pH being adjusted to 9 with sodium hydroxide solution. This is followed by cooling down to 0° to 5° C. and, after the pH has been lowered to 7 in hydrochloric acid, addition of a fine suspension of 9.7 parts of cyanuric chloride in 100 parts of ice-water. Stirring is continued at 0° to 5° C. while the pH is maintained between 6.5 and 7 with sodium carbonate until the reaction is ended, which takes about 1½ hours. A neutral solution of 24 parts of 1-amino-4-β-(β'-chloroethylsulfonyl)-ethylaminocarbonylmethoxybenzene-3-sulfonic acid hydrochloride in 200 parts of water is then added dropwise in the course of 10 minutes. The temperature is raised to 20° to 30° C. and stirring at a pH maintained at 6.5 to 7 is continued until the reaction is ended. This is followed by cooling down to 20° C., salting out with 400 parts of potassium chloride, filtering off the precipitated dye under suction, and drying. It dyes cellulose fibres in reddish blue shades having good fastness properties and conforms to the formula

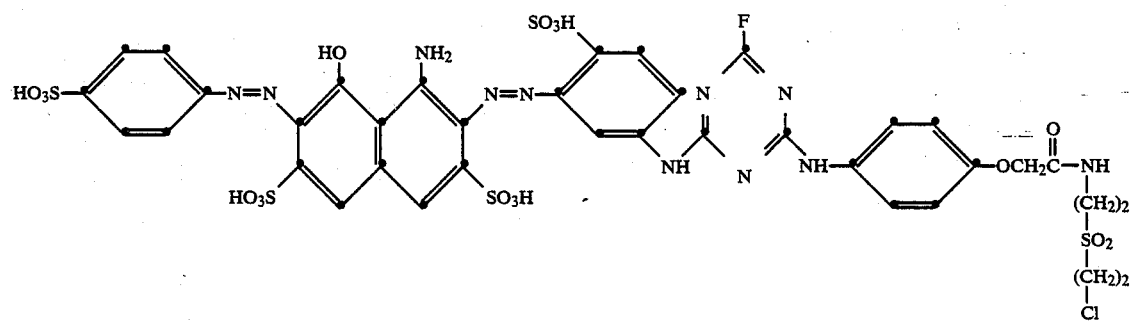

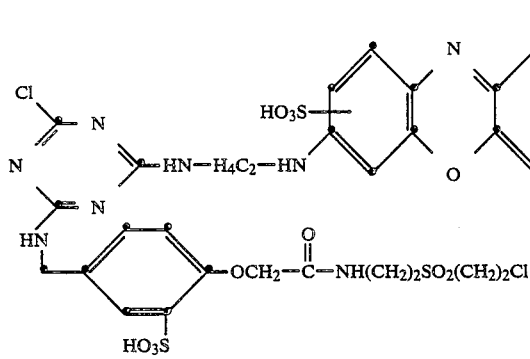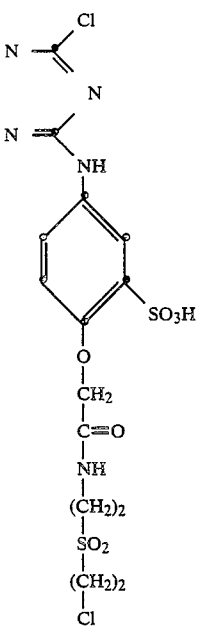

EXAMPLE 18

19.7 parts of the compound of the formula are stirred in a mixture of 125 parts of ice and 125 parts of water until homogeneous, and the stirred mixture is brought to pH 7 with sodium hydroxide solution. 4 parts of cyanuric fluoride are then added at a temperature of 0° to 2° C. while the pH is maintained at 5.5 to 6 with sodium carbonate. When the reaction is ended, a neutral solution of 14 parts of 1-amino-4-$\beta$-($\beta'$-chloroethylsulfonyl)-ethylaminocarbonyl-methoxybenzene-3-sulfonic acid hydrochloride in 100 parts of water is then added dropwise. The temperature is raised to 0° to 30° C. and stirring at a pH maintained at 6.5 to 7 is continued until the reaction is ended. After cooling down to room temperature, the dye is salted out with sodium chloride, filtered off with suction and dried. It has the approximate formula

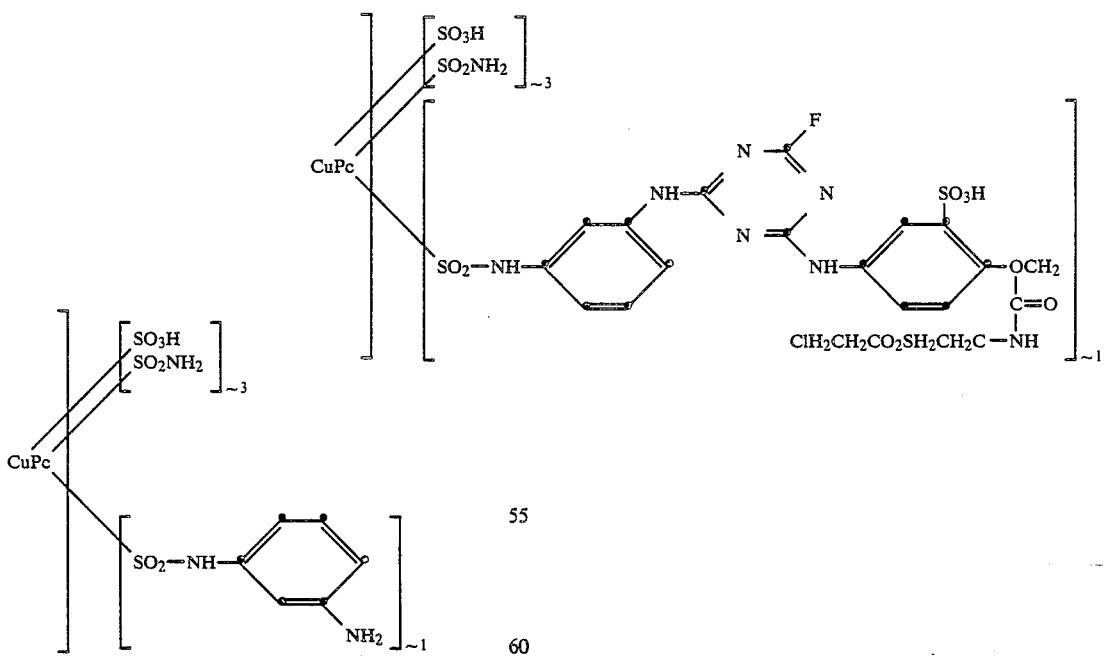

and dyes cellulose material in turquoise blue shades having good fastness properties.

EXAMPLE 19

58 parts of the compound of the approximate formula

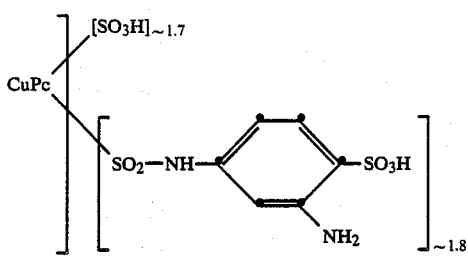

are stirred in a mixture of 300 parts of water and 125 parts of ice until homogeneous, and the stirred mixture is brought to pH 7 with sodium hydroxide solution. At 0° to 5° C. a fine suspension of 16.6 parts of cyanuric chloride in 170 parts of ice-water is then added, while the pH is maintained at 5.3 to 5.5 with 10% sodium hydroxide solution. As soon as the reaction has ended, a neutral solution of 43 parts of 1-amino-4-β-(β'-chloroethylsulfonyl)-ethylaminocarbonylmethoxybenzene hydrochloride in 250 parts of water is added dropwise. The temperature is then raised to 20° to 30° C. and is maintained at that level for 4 hours, during which the pH is maintained at 6.5 to 7 with sodium hydrogencarbonate. After cooling down, the dye is salted out with sodium chloride, filtered off with suction and dried. It conforms to the approximate formula

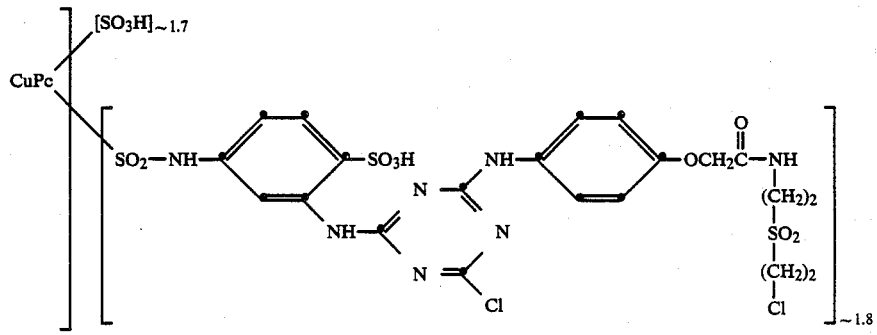

Further dyes which can be prepared by the methods employed in the above examples are the reactive dyes of formulas below.

| Example | | X | X | Hue |
|---|---|---|---|---|
| 20 | (structure) | Cl | F | lemon yellow |
| 21 | (structure) | Cl | F | lemon yellow |
| 22 | (structure) | Cl | F | lemon yellow |

| Example | (structure) | X | X | Hue |
|---|---|---|---|---|
| 23 | | Cl | F | lemon yellow |
| 24 | | Cl | F | golden yellow |
| 25 | | Cl | F | golden yellow |
| 26 | | Cl | F | golden yellow |

-continued

| Example | Structure | X | X | Hue |
|---|---|---|---|---|
| 27 | (structure with naphthalene-SO₃H/HO₃S, N=N, phenyl-NHCONH₂, NH-triazine(C-X)-NH-phenyl-OCH₂C(O)-NHCH₂CH₂SO₂CH₂CH₂OSO₃H) | Cl | F | golden yellow |
| 28 | (structure with phenyl-SO₃H/SO₃H, N=N, naphthalene-OH/HO₃S, NH-triazine(C-X)-NH-phenyl-OCH₂C(O)-NHCH₂CH₂SO₂CH₂CH₂OSO₃H) | Cl | F | yellowish orange |
| 29 | (structure with phenyl-SO₃H/SO₃H, N=N, naphthalene-OH/HO₃S, NH-triazine(C-X)-NH-phenyl-OCH₂C(O)-NHCH₂CH₂SO₂CH=CH₂) | Cl | F | yellowish orange |
| 30 | (structure with phenyl-SO₃H/OCH₃, N=N, naphthalene-OH/HO₃S, NH-triazine(C-X)-NH-phenyl-OCH₂C(O)-NHCH₂CH₂SO₂CH₂CH₂OSO₃H) | Cl | F | orange |

-continued

| Example | Structure | X | X | Hue |
|---|---|---|---|---|
| 31 | SO₃H-(C₆H₂(CH₃)(SO₃H))-N=N-(naphthalene(OH)(SO₃H))-NH-(triazine with X, NH)-NH-(C₆H₄)-OCH₂C(O)-NHCH₂CH₂SO₂CH=CH₂ | Cl | F | orange |
| 32 | SO₃H-(naphthalene(SO₃H))-N=N-(naphthalene(OH)(SO₃H))-NH-(triazine with X, NH)-NH-(C₆H₄)-CH₂C(O)-NHCH₂CH₂SO₂CH₂CH₂OSO₃H | Cl | F | orange |
| 33 | SO₃H-(C₆H₂(CH₃)(SO₃H))-N=N-(naphthalene(OH)(SO₃H))-NH-(triazine with X, NH)-NH-(C₆H₄)-OCH₂C(O)-NHCH₂CH₂SO₂CH₂CH₂OSO₃H | Cl | F | reddish orange |
| 34 | SO₃H-(naphthalene(SO₃H))-N=N-(naphthalene(OH)(SO₃H))-NH-(triazine with X, NH)-NH-(C₆H₄)-CH₂C(O)-NHCH₂CH₂SO₂CH₂CH₂OSO₃H | Cl | F | reddish orange |

-continued

| Example | Structure | X | X | Hue |
|---|---|---|---|---|
| 35 | (structure with naphthalene-azo-naphthol coupled via triazine to phenyl-OCH₂-C(O)-NH(CH₂)₂SO₂CH=CH₂, with SO₃H groups) | Cl | F | reddish orange |
| 36 | (structure with methoxy/sulfo-phenyl-azo-naphthol-amino-triazine linked to phenyl-OCH₂-C(O)-NHCH₂CH₂SO₂CH₂CH₂OSO₃H) | Cl | F | scarlet |
| 37 | (structure with benzoylamino-naphthol-bis-azo system coupled through triazine to phenyl-OCH₂-C(O)-NH(CH₂)₂SO₂CH=CH₂) | Cl | F | red |

-continued
| Example | | X | X | Hue |
|---|---|---|---|---|
| 38 | 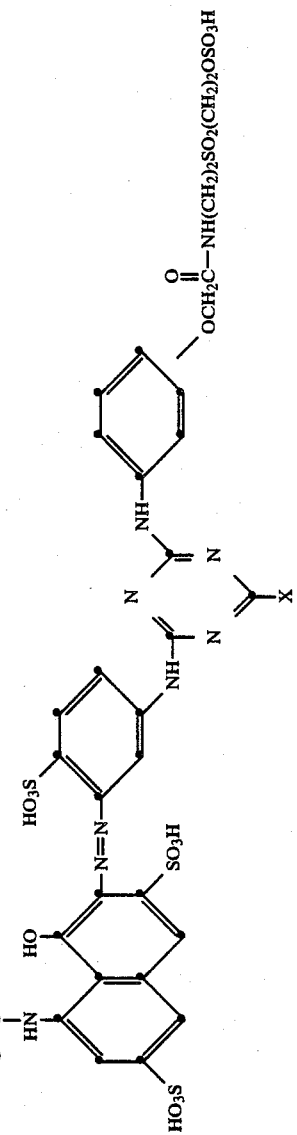 | Cl | F | scarlet |
| 39 | 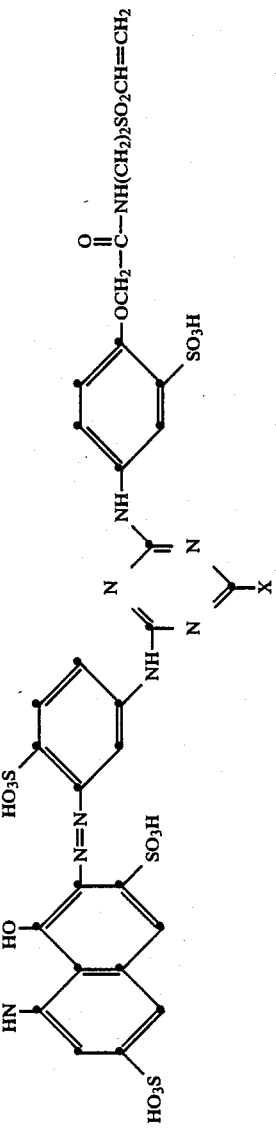 | Cl | F | scarlet |

-continued

| Example | (structure) | X | X | Hue |
|---|---|---|---|---|
| 40 | | Cl | F | red |
| 41 | | Cl | F | scarlet |

-continued

| Example | Structure | X | X | Hue |
|---|---|---|---|---|
| 42 | (C₂H₅-C(=O)-NH-naphthalene(OH)(SO₃H)(HO₃S)-N=N-benzene(SO₃H)(HO₃S)-NH-triazine(X)(X)-NH-C₆H₄-NH-C(=O)-CH₂-NH(CH₂)₂SO₂-CH=CH₂) | Cl | F | scarlet |
| 43 | (H₂C=HCO₂S-C₆H₄-N=N-naphthalene(OH)(HO₃S)(SO₃H)-NH-triazine(X)(X)-C₆H₄-OCH₂-C(=O)-NHCH₂CH₂SO₂CH=CH₂) | Cl | F | red |
| 44 | (H₂C=HCO₂S(H₂C)₂HN-C(=O)-C₆H₄(SO₃H)-N=N-naphthalene(OH)(HO₃S)(SO₃H)-NH-triazine(X)-NH-C₆H₄-CH₂-C(=O)-NH(CH₂)₂SO₂-CH=CH₂) | Cl | F | scarlet |

-continued
| Example | | X | X | Hue |
|---|---|---|---|---|
| 45 | 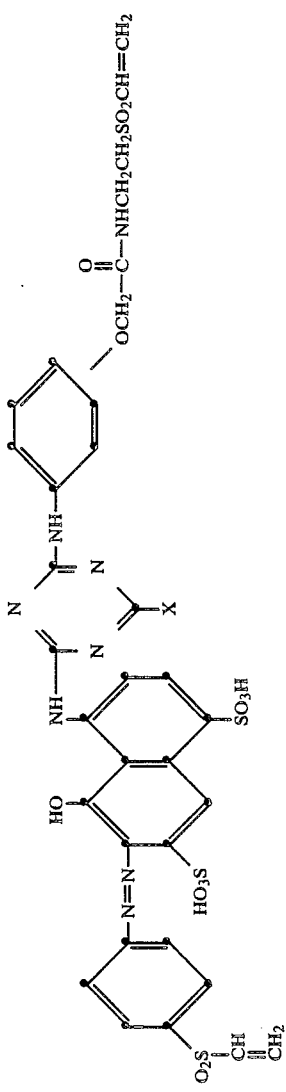 | Cl | F | scarlet |
| 46 | 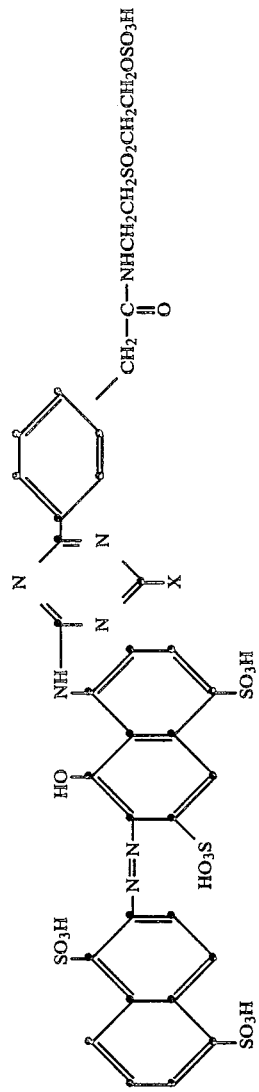 | Cl | F | red |
| 47 | 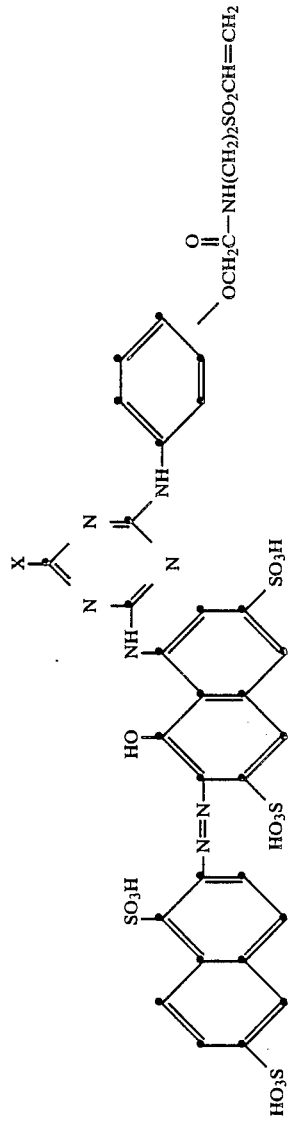 | Cl | F | red |

| Example | (structure) | X | X | Hue |
|---|---|---|---|---|
| 48 | | Cl | F | red |
| 49 | | Cl | F | navy |
| 50 | | Cl | F | navy |

-continued

| Example | (structure) | X | X | Hue |
|---|---|---|---|---|
| 51 | | Cl | F | navy |
| 52 | | Cl | F | navy |
| 53 | | Cl | F | blue |

-continued
| Example | Structure | X | X | Hue |
|---|---|---|---|---|
| 54 | | Cl | F | blue |
| 55 | | Cl | F | blue |
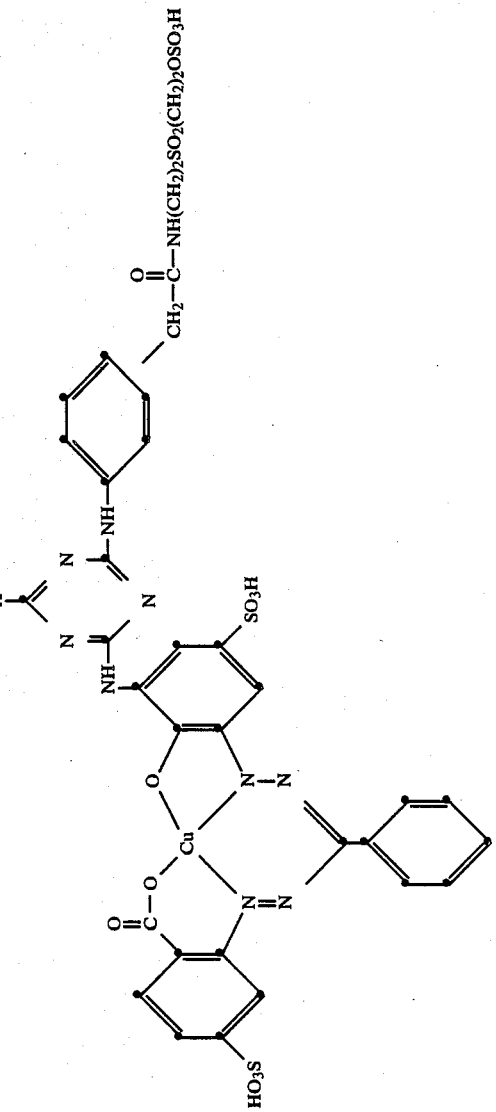

2 parts of the reactive dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 10 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

Dyeing method V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

Dyeing method VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric in then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

Printing method I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

What is claimed is:

1. A reactive dye of the formula

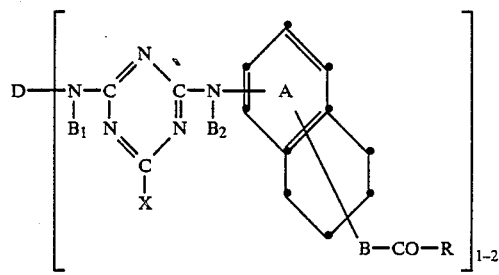

in which D is the radical of a monoazo, polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide dye, $B_1$ and $B_2$ are independently of each other hydrogen or $C_1$-$C_4$-alkyl which is unsubstituted or is further substituted by halogen, hydroxyl, cyano, $C_1$-$C_4$-alkoxy, $C_1$-$C_4$-alkoxy-carbonyl, carboxyl, sulfamoyl, sulfo or sulfato, X is fluorine, chlorine, bromine, sulfo, $C_1$-$C_4$-alkylsulfonyl or phenylsulfonyl, B is —$CH_{2n}$ or —O—$CH_{2n}$, n is 1 to 6, R is

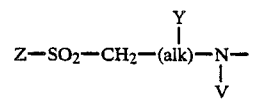

-continued

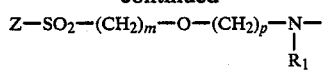

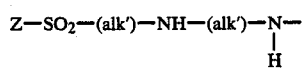

or

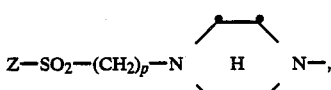

Z is β-sulfatoethyl, β-thiosulfatoethyl, β-phosphatoethyl, β-acetoxyethyl, β-haloethyl or vinyl, alk is alkylene having 1 to 6 carbon atoms or a branched isomer thereof, Y is hydrogen, chlorine, bromine, fluorine, hydroxyl, sulfato, alkanoyloxy of up to 4 carbon atoms, cyano, carboxyl, $C_1$-$C_5$-alkoxy-carbonyl, carbamoyl, or —$SO_2$—Z, in which Z is as defined above, V is hydrogen of $C_1$-$C_4$-alkyl which is unsubstituted or is substituted by carboxyl, sulfo, sulfamoyl, N-($C_1$-$C_2$-alkyl)-sulfamoyl, N,N-di-($C_1$-$C_2$-alkyl)-sulfamoyl, $C_1$-$C_2$-alkoxy, halogen or hydroxyl, or

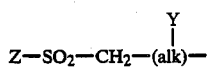

in which Z, alk and Y are as defined above, $R_1$ is hydrogen or $C_1$-$C_6$-alkyl, the alk's are independently of each other polymethylene radicals having 2 to 6 carbon atoms or branched isomers thereof, m is 1 to 6, p is 1 to 6, and q is 1 to 6, and the benzene or naphthalene radical A is unsubstituted or substituted by $C_1$-$C_4$-alkyl, $C_1$-$C_4$-alkoxy, alkanoylamino having up to 8 carbon atoms, benzoylamino, amino, $C_1$-$C_4$-alkylamino, phenylamino, N,N-di-(β-hydroxyethyl)-amino, N,N-di-(β-sulfatoethyl)-amino, sulfobenzylamino, N,N-disulfobenzylamino, $C_1$-$C_4$-alkoxy-carbonyl, $C_1$-$C_4$-alkylsulfonyl, trifluoromethyl, nitro, cyano, halogen, carbamoyl, N-$C_1$-$C_4$-alkyl-carbomoyl sulfamoyl, N-$C_1$-$C_4$-alkyl-sulfamoyl, N-β-hydroxyethylsulfamoyl, N,N-di-(β-hydroxyethyl)-sulfamoyl, N-phenylsulfamoyl, ureido, hydroxyl, carboxyl, sulfomethyl or sulfo.

2. A reactive dye according to claim 1, of the formula

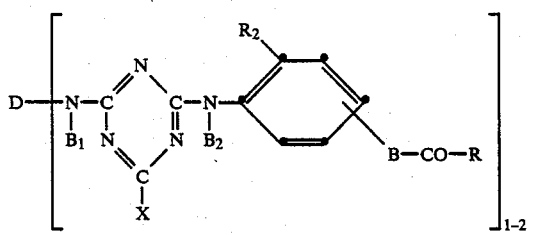

in which $R_2$ is hydrogen, $C_{1-4}$alkyl, $C_{1-4}$alkoxy, halogen, hydroxyl, carboxyl or sulfo, and D, $B_1$, $B_2$, X, B and R are as defined in claim 1.

3. A reactive dye according to claim 1, wherein D is the radical of a monoazo or disazo dye.

4. A reactive dye according to claim 1, wherein D is the radical of a metal complex azo or formazan dye.

5. A reactive dye according to claim 1, wherein D is the radical of an anthraquinone dye.

6. A reactive dye according to claim 1, wherein D is the radical of a phthalocyanine dye.

7. A reactive dye according to claim 3, wherein D is a monoazo or disazo dye of the formula $D_1$—N=N—(M—N=N)$_r$—K—,

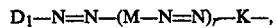

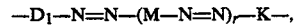

or of a metal complex derived therefrom, $D_1$ is a benzene or naphthalene diazo component, M is a benzene or naphthalene middle component, and K is a benzene, naphthalene, pyrazolone, 6-hydroxy-2-pyridone or acetoacetarylamide coupling component, where $D_1$, M and K are not further substituted or are further substituted by $C_1$-$C_4$-alkyl, $C_1$-$C_4$-alkoxy, alkanoylamino having up to 8 carbon atoms, benzoylamino, amino, $C_1$-$C_4$-alkylamino, phenylamino, N,N-di-(β-hydroxyethyl)-amino, N,N-di-(β-sulfatoethyl)-amino, sulfobenzylamino, N,N-disulfobenzylamino, $C_1$-$C_4$-alkoxy-carbonyl, $C_1$-$C_4$-alkylsulfonyl, trifluoromethyl, nitro, cyano, halogen, carbomoyl, N-$C_1$-$C_4$-alkyl-carbamoyl, sulfamoyl, N-$C_1$-$C_4$-alkyl-sulfamoyl, N-β-hydroxyethylsulfamoyl, N,N-di-(β-hydroxyethyl)-sulfamoyl, N-phenylsulfamoyl, ureido, hydroxyl, carboxyl, sulfomethyl or sulfo, r is 0 or 1, and $D_1$, M and K together contain at least two sulfo groups.

8. A reactive dye according to claim 7, wherein $D_1$, M and K are not further substituted or are further substituted by hydroxyl, amino, methyl, ethyl, methoxy, ethoxy, alkanoylamino having 2 to 4 carbon atoms, benzoylamino or halogen.

9. A reactive dye according to claim 7, wherein $D_1$, M and K contain 3 or 4 sulfo groups.

10. A reactive dye according to claim 3, wherein D is a disazo dye of the formula $D_1$—N=N—K—N=N—$D_2$— or

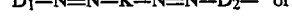

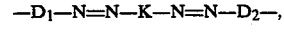

$D_1$ and $D_2$ are independently of each other benzene or naphthalene diazo components, and K is a naphthalene coupling component, where $D_1$, and $D_2$ and K are not further substituted or are further substituted by $C_1$-$C_4$-alkyl, $C_1$-$C_4$-alkoxy, alkanoylamino having up to 8 carbon atoms, benzoylamino, amino, $C_1$-$C_4$-alkylamino, phenylamino, N,N-di-(β-hydroxyethyl)-amino, N,N-di-(β-sulfatoethyl)-amino, sulfobenzylamino, N,N-disulfobenzylamino, $C_1$-$C_4$-alkoxy-carbonyl, $C_1$-$C_4$-alkylsulfonyl, trifluoromethyl, nitro, cyano, halogen, carbamoyl, N-$C_1$-$C_4$-alkyl-carbamoyl, sulfamoyl, N-$C_1$-$C_4$-alkylsulfamoyl, N-β-hydroxyethylsulfamoyl, N,N-di-(β-hydroxyethyl)-sulfamoyl, N-phenylsulfamoyl, ureido, hydroxyl, carboxyl, sulfomethyl or sulfo, and $D_1$, $D_2$ and K together contain at least two sulfo groups.

11. A reactive dye according to claim 10, wherein $D_1$, $D_2$ and K are not further substituted or are further substituted by hydroxyl, amino, methyl, ethyl, methoxy, ethoxy, $C_2$-$C_4$-alkanoylamino, benzoylamino or halogen.

12. A reactive dye according to claim 10, wherein $D_1$, $D_2$ and K together contain 3 or 4 sulfo groups.

13. A reactive dye according to claim 4, wherein D is the radical of a 1:1 copper complex azo dye consisting of the benzene or naphthalene radical and the copper atom is bonded on each side to a metallizable group in ortho-position to the azo bridge.

14. A reactive dye according to claim 4, where D is a phthalocyanine dye of the formula

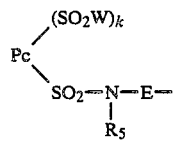

where Pc is the radical of a copper- or nickel-phthalocyanine, W is —OH and/or —NR₃R₄, R₃ and R₄ are independently of each other hydrogen or alkyl which has 1 to 4 carbon atoms and which is unsubstituted or substituted by hydroxyl or sulfo, R₅ is hydrogen or alkyl having 1 to 4 carbon atoms, E is phenylene which is unsubstituted or substituted by alkyl having 1 to 4 carbon atoms, halogen carboxyl or sulfo, or is alkylene having 2 to 6 carbon atoms, and k is 1 to 3

15. A reactive dye according to claim 14, wherein E is sulfophenylene or ethylene.

16. A reactive dye according to claim 5, wherein D is an anthraquinone dye of the formula

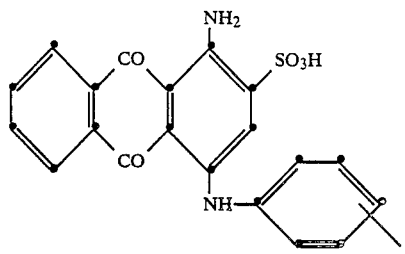

where the anthraquinone nucleus is not further substituted or is further substituted by sulfo and the phenylene is not further substituted or is further substituted by C₁-C₄-alkyl, C₁-C₄-alkoxy, halogen, carboxyl or sulfo, and the dye contains at least two strongly water-solubilizing groups.

17. A reactive dye according to claim 7, of the formula

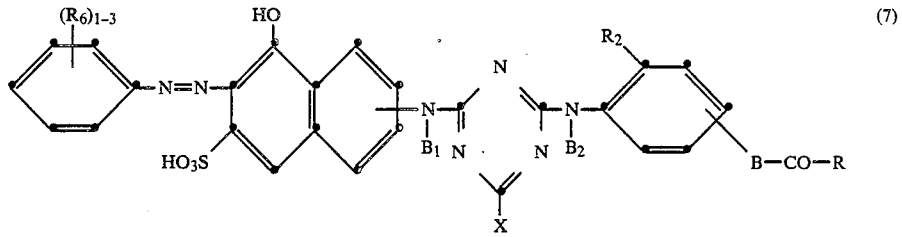

(7)

in which R₆ is 1 to 3 substituents from the group consisting of C₁₋₄alkyl, C₁₋₄alkoxy, halogen, carboxyl and sulfo.

18. A reactive dye according to claim 7, of the formula

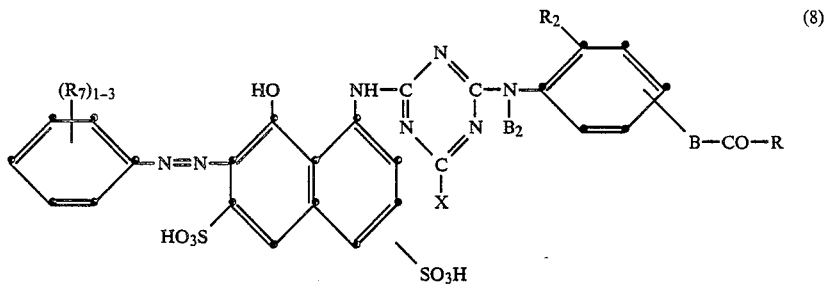

(8)

in which R₇ is 1 to 3 substituents from the group consisting of C₁₋₄alkyl, C₁₋₄alkoxy, halogen, carboxyl and sulfo.

19. A reactive dye according to claim 7, of the formula

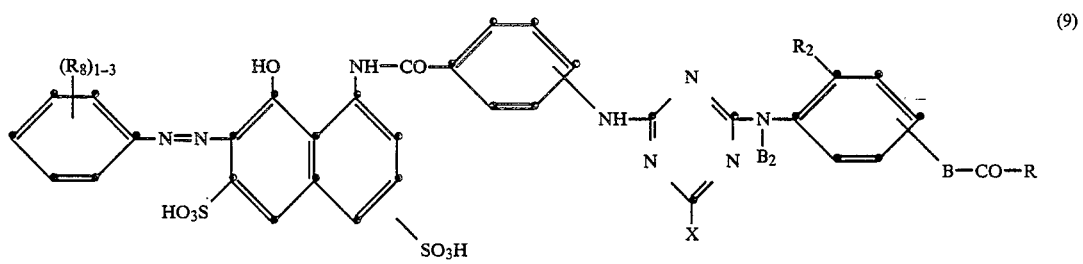

(9)

in which $R_8$ is 1 to 3 substituents from the group consisting of $C_{1-4}$alkyl, $C_{1-4}$alkoxy, halogen, carboxyl and sulfo.

20. A reactive dye according to claim 7, of the formula

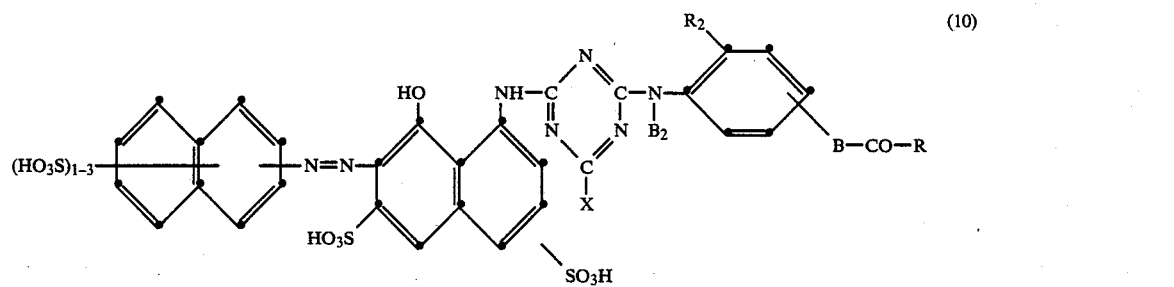

21. A reactive dye according to claim 7, of the formula

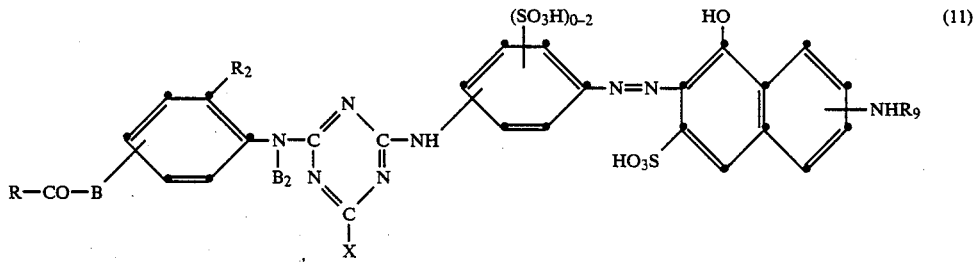

in which $R_9$ is $C_{1-4}$alkanoyl or benzoyl.

22. A reactive dye according to claim 7, of the formula

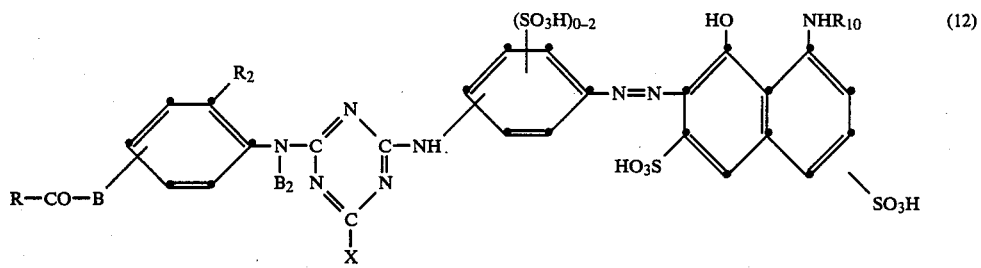

in which $R_{10}$ is $C_{1-4}$alkanoyl or benzoyl.

23. A reactive dye according to claim 7, of the formula

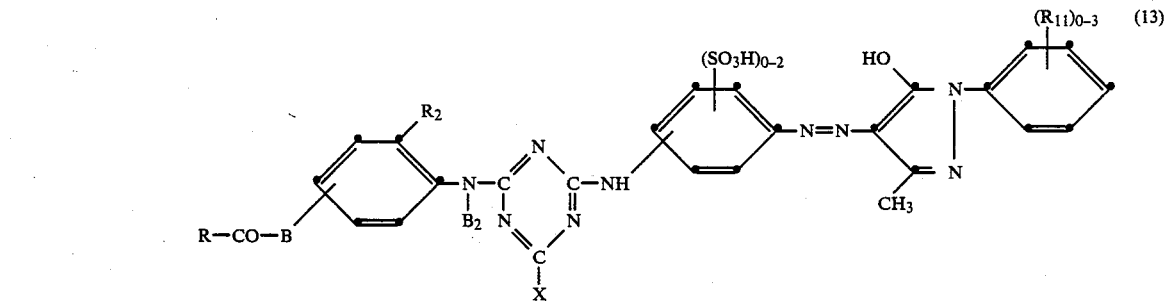

in which $R_{11}$ is 0 to 3 substituents from the group consisting of $C_{1-4}$alkyl, $C_{1-4}$alkoxy, halogen, carboxyl and sulfo.

24. A reactive dye according to claim 7, of the formula

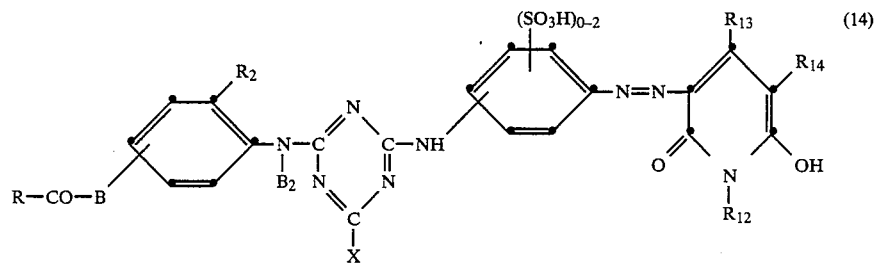

in which $R_{12}$ and $R_{13}$ are independently of each other hydrogen, $C_{1-4}$alkyl or phenyl, $R_{14}$ is hydrogen, cyano, carbamoyl or sulfomethyl.

25. A reactive dye according to claim 10, of the formula

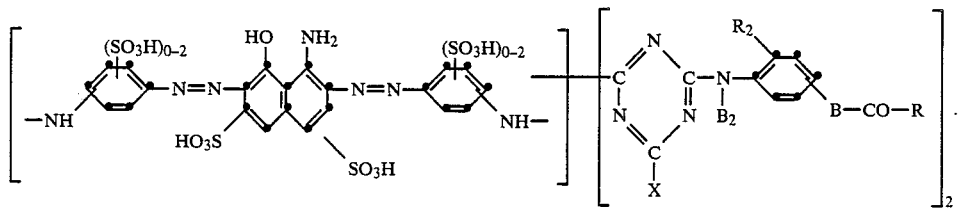

26. A heavy metal complex of a reactive dye according to claim 1.

27. A reactive dye according to claim 1, wherein D is a dioxazine dye.

28. A reactive dye according to claim 27, wherein D is a dioxazine dye of the formula

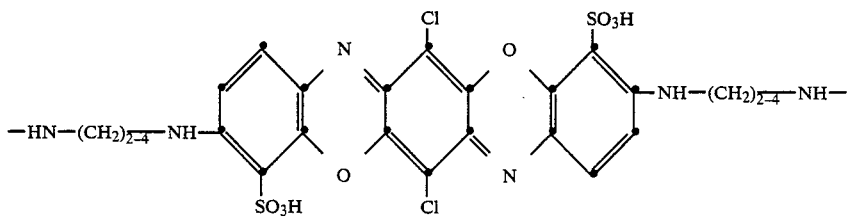

29. A reactive dye according to claim 1, wherein Z is β-sulfatoethyl, β-chloroethyl or vinyl.

* * * * *